US011737030B2

(12) United States Patent
Li et al.

(10) Patent No.: US 11,737,030 B2
(45) Date of Patent: Aug. 22, 2023

(54) METHOD AND APPARATUS FOR DERIVING TRANSMIT POWER OF UL (UPLINK) RS (REFERENCE SIGNAL) IN A WIRELESS COMMUNICATION SYSTEM

(71) Applicant: ASUSTek Computer Inc., Taipei (TW)

(72) Inventors: Ming-Che Li, Taipei City (TW); Ko-Chiang Lin, Taipei City (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 151 days.

(21) Appl. No.: 15/718,335

(22) Filed: Sep. 28, 2017

(65) Prior Publication Data
US 2018/0103433 A1 Apr. 12, 2018

Related U.S. Application Data

(60) Provisional application No. 62/405,533, filed on Oct. 7, 2016, provisional application No. 62/405,564, filed on Oct. 7, 2016.

(51) Int. Cl.
H04W 52/14 (2009.01)
H04W 52/42 (2009.01)
H04W 52/32 (2009.01)

(52) U.S. Cl.
CPC ....... H04W 52/146 (2013.01); H04W 52/325 (2013.01); H04W 52/42 (2013.01)

(58) Field of Classification Search
CPC ......... H04W 52/00–60; H04W 52/146; H04W 52/325; H04W 52/42; H04W 52/36; H04L 5/0048
See application file for complete search history.

(56) References Cited

U.S. PATENT DOCUMENTS 8,982,782 B1  3/2015 Vargantwar
9,215,650 B2  12/2015 Jung
(Continued)

FOREIGN PATENT DOCUMENTS

CN  104620645    5/2015
JP  2014533899  12/2014
(Continued)

OTHER PUBLICATIONS

Office Action from the Korean Intellectual Property Office in corresponding KR Application No. 10-2017-0126220, dated Jan. 17, 2019.
(Continued)

Primary Examiner — Jinsong Hu
Assistant Examiner — Rui M Hu
(74) Attorney, Agent, or Firm — Cooper Legal Group LLC

(57) ABSTRACT

A method and apparatus are disclosed, from the perspective of a UE, for transmitting UL RS. In one embodiment, the method includes deriving a first transmit power of a first UL RS based on a first power control mechanism, wherein derivation of the first transmit power based on the first power control mechanism is associated with an uplink data channel. In addition, the method includes deriving a second transmit power of a second UL RS based on a second power control mechanism, wherein derivation of the second transmit power based on the second power control mechanism is not associated with the uplink data channel. Furthermore, the method includes transmitting the first UL RS with the first transmit power. The method also includes transmitting the second UL RS with the second transmit power.

18 Claims, 18 Drawing Sheets

(56) References Cited

U.S. PATENT DOCUMENTS

| | | | | |
|---|---|---|---|---|
| 9,538,410 | B2* | 1/2017 | Park | H04L 5/14 |
| 9,900,849 | B2* | 2/2018 | Xu | H04W 52/325 |
| 10,090,986 | B2* | 10/2018 | Kim | H04B 7/0478 |
| 10,142,949 | B2* | 11/2018 | Imamura | H04W 24/02 |
| 10,159,052 | B2* | 12/2018 | Xu | H04W 52/322 |
| 10,271,287 | B2* | 4/2019 | Sun | H04W 52/245 |
| 10,320,475 | B2* | 6/2019 | Abedini | H04B 7/0814 |
| 10,750,453 | B2* | 8/2020 | Zhou | H04W 74/0833 |
| 10,917,854 | B2* | 2/2021 | Liu | H04W 52/40 |
| 11,012,948 | B2* | 5/2021 | Zhang | H04L 5/0048 |
| 11,166,242 | B2* | 11/2021 | Wu | H04W 52/36 |
| 2010/0103867 | A1 | 4/2010 | Kishiyama | H04W 52/16 370/320 |
| 2010/0246561 | A1* | 9/2010 | Shin | H04L 5/0096 375/267 |
| 2011/0098054 | A1* | 4/2011 | Gorokhov | H04B 7/024 455/422.1 |
| 2011/0159914 | A1* | 6/2011 | Chen | H04W 52/362 455/522 |
| 2012/0113908 | A1* | 5/2012 | Jen | H04W 52/30 370/329 |
| 2013/0077571 | A1* | 3/2013 | Papasakellariou | H04W 52/325 370/328 |
| 2013/0121279 | A1* | 5/2013 | Noh | H04L 5/0048 370/329 |
| 2013/0217404 | A1* | 8/2013 | Jung | H04W 48/20 455/452.1 |
| 2013/0242911 | A1 | 9/2013 | Heo et al. | |
| 2013/0250875 | A1* | 9/2013 | Chen | H04W 52/365 370/329 |
| 2014/0036809 | A1* | 2/2014 | Xu | H04W 52/325 370/329 |
| 2014/0071903 | A1* | 3/2014 | Sorrentino | H04W 52/54 370/329 |
| 2014/0112260 | A1* | 4/2014 | Sorrentino | H04W 52/325 370/329 |
| 2014/0169322 | A1* | 6/2014 | Ouchi | H04W 52/146 370/329 |
| 2014/0177531 | A1* | 6/2014 | Imamura | H04L 5/0048 370/328 |
| 2014/0185481 | A1* | 7/2014 | Seol | H04W 52/24 370/252 |
| 2014/0219232 | A1* | 8/2014 | Takeda | H04W 72/23 370/329 |
| 2014/0376482 | A1* | 12/2014 | Kim | H04L 5/0048 370/329 |
| 2015/0018030 | A1 | 1/2015 | Park et al. | |
| 2015/0085787 | A1* | 3/2015 | Ouchi | H04B 17/318 370/329 |
| 2015/0092699 | A1* | 4/2015 | Chen | H04W 52/04 370/329 |
| 2016/0080060 | A1 | 3/2016 | Yu | |
| 2016/0150490 | A1* | 5/2016 | Ouchi | H04W 72/0446 455/522 |
| 2016/0165547 | A1* | 6/2016 | Ouchi | H04L 5/14 455/522 |
| 2016/0227485 | A1* | 8/2016 | Davydov | H04W 52/146 |
| 2016/0337018 | A1* | 11/2016 | Hwang | H04W 52/325 |
| 2017/0141894 | A1* | 5/2017 | Wei | H04B 17/309 |
| 2018/0014254 | A1* | 1/2018 | Hwang | H04W 72/0473 |
| 2018/0049137 | A1* | 2/2018 | Li | H04W 52/242 |
| 2018/0352539 | A1* | 12/2018 | Takano | H04W 72/21 |
| 2018/0368075 | A1* | 12/2018 | Chen | H04W 52/42 |
| 2019/0097772 | A1* | 3/2019 | Yang | H04B 7/0695 |
| 2019/0104549 | A1* | 4/2019 | Deng | H04L 27/2607 |
| 2020/0106647 | A1* | 4/2020 | Chen | H04L 1/0026 |
| 2020/0245253 | A1* | 7/2020 | Chen | H04W 52/246 |

FOREIGN PATENT DOCUMENTS

| | | |
|---|---|---|
| JP | 2015529037 | 10/2015 |
| JP | 2016500982 | 1/2016 |
| KR | 20140009902 | 1/2014 |
| KR | 20140091686 | 7/2014 |
| KR | 20150080523 | 7/2015 |
| WO | 2009076286 | 6/2009 |
| WO | 2013025144 | 2/2013 |
| WO | 2016024644 | 2/2016 |
| WO | 2016060242 | 4/2016 |
| WO | 2016206051 | 12/2016 |
| WO | 2017027055 | 2/2017 |

OTHER PUBLICATIONS

Office Action from Chinese Patent Office (SIPO) in corresponding CN Application No. 20171091288.3, dated Mar. 21, 2019.

European Search Report from corresponding EP Application No. 17193698.2, dated Jan. 4, 2018.

Office Action from corresponding TW Application No. 106133468, dated Jul. 16, 2018.

Office Action from the Japan Patent Office in corresponding JP Application No. 2017-187393, dated Oct. 9, 2018.

* cited by examiner

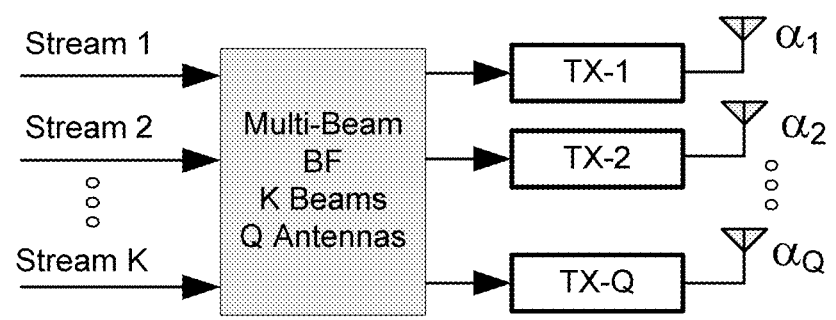
(a) Digital beamforming
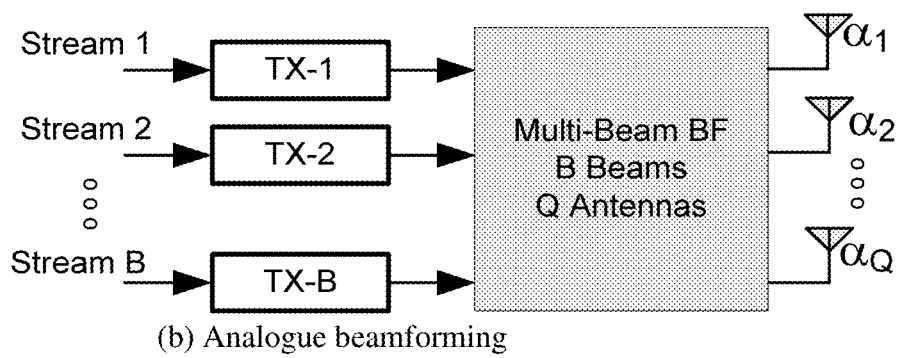
(b) Analogue beamforming
FIG. 5

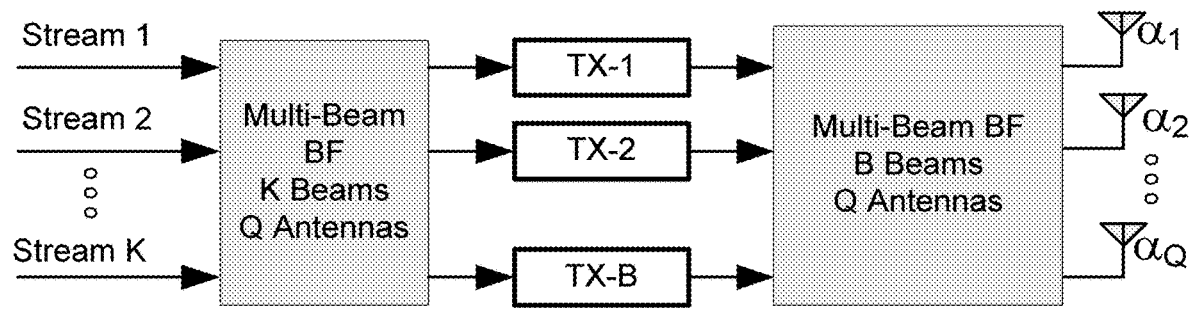
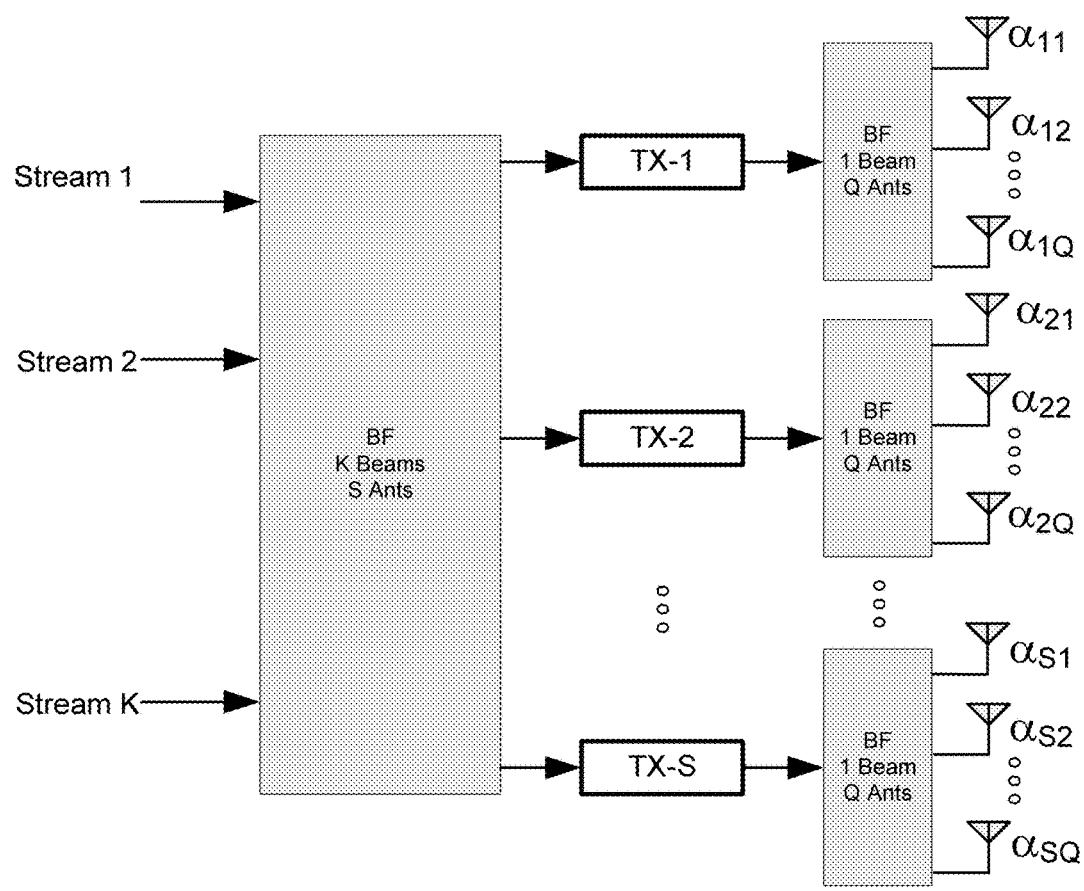
(c) Hybrid beamforming: Left = fully connected, Right = sub-array
FIG. 5 CONTINUED

| TDD UL/DL Configuration | subframe number $i$ | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | 7 | 4 | - | - | 6 | 7 | 4 |
| 1 | - | - | 6 | 4 | - | - | - | 6 | 4 | - |
| 2 | - | - | 4 | - | - | - | - | 4 | - | - |
| 3 | - | - | 4 | 4 | 4 | - | - | - | - | - |
| 4 | - | - | 4 | 4 | - | - | - | - | - | - |
| 5 | - | - | 4 | - | - | - | - | - | - | - |
| 6 | - | - | 7 | 7 | 5 | - | - | 7 | 7 | - |

FIG. 6 (PRIOR ART)

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | -1 | -4 |
| 1 | 0 | -1 |
| 2 | 1 | 1 |
| 3 | 3 | 4 |

FIG. 7A (PRIOR ART)

| TPC Command Field in DCI format 3A | Accumulated $\delta_{PUSCH,c}$ [dB] |
|---|---|
| 0 | -1 |
| 1 | 1 |

FIG. 7B (PRIOR ART)

| TPC Command Field in DCI format 1A/1B/1D/1/2A/2B/2C/2D/2/3 | $\delta_{PUCCH}$ [dB] |
|---|---|
| 0 | -1 |
| 1 | 0 |
| 2 | 1 |
| 3 | 3 |

FIG. 8 (PRIOR ART)

| TPC Command Field in DCI format 3A | $\delta_{PUCCH}$ [dB] |
|---|---|
| 0 | -1 |
| 1 | 1 |

FIG. 9 (PRIOR ART)

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity<br><br>If the UE is configured with PMI/RI reporting: closed-loop spatial multiplexing |
| 9 | For a non-BL/CE UE, if the UE is configured without PMI/RI reporting: if the number of PBCH antenna ports is one, single-antenna port, port 0; otherwise transmit diversity<br><br>For a non-BL/CE UE, if the UE is configured with PMI/RI reporting or without PMI reporting: if the number of CSI-RS ports is one, single-antenna port, port 7; otherwise up to 8 layer transmission, ports 7-14 (see subclause 7.1.5B)<br><br>For a BL/CE UE, if the UE is not configured with periodic CSI reporting mode 1-1: if the number of PBCH antenna ports is one, single-antenna port, port 0; otherwise transmit diversity<br><br>For a BL/CE UE, if the UE is configured with periodic CSI reporting mode 1-1: if the number of PBCH antenna ports is one, single-antenna port, port 0; otherwise closed-loop spatial multiplexing with a single transmission layer |
| 10 | If a CSI process of the UE is configured without PMI/RI reporting: if the number of CSI-RS ports is one, single-antenna port, port7; otherwise transmit diversity<br><br>If a CSI process of the UE is configured with PMI/RI reporting or without PMI reporting: if the number of CSI-RS ports is one, single-antenna port, port 7; otherwise up to 8 layer transmission, ports 7-14 (see subclause 7.1.5B) |

FIG. 10 (PRIOR ART)

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 11 (PRIOR ART)

| CQI index | modulation | code rate x 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

FIG. 12 (PRIOR ART)

| CQI index | modulation | code rate x 1024 x $R^{CSI}$ | efficiency |
|---|---|---|---|
| 0 | out of range | | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | Reserved | Reserved | Reserved |
| 12 | Reserved | Reserved | Reserved |
| 13 | Reserved | Reserved | Reserved |
| 14 | Reserved | Reserved | Reserved |
| 15 | Reserved | Reserved | Reserved |

METHOD AND APPARATUS FOR DERIVING TRANSMIT POWER OF UL (UPLINK) RS (REFERENCE SIGNAL) IN A WIRELESS COMMUNICATION SYSTEM

CROSS-REFERENCE TO RELATED APPLICATIONS

The present Application claims the benefit of U.S. Provisional Patent Application Ser. Nos. 62/405,533 and 62/405,564 filed on Oct. 7, 2016, the entire disclosure of which are incorporated herein in its entirety by reference.

FIELD

This disclosure generally relates to wireless communication networks, and more particularly, to a method and apparatus for deriving transmit power of UL RS in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed, from the perspective of a UE (User Equipment), for transmitting UL RS. In one embodiment, the method includes deriving a first transmit power of a first UL RS based on a first power control mechanism, wherein derivation of the first transmit power based on the first power control mechanism is associated with an uplink data channel. In addition, the method includes deriving a second transmit power of a second UL RS based on a second power control mechanism, wherein derivation of the second transmit power based on the second power control mechanism is not associated with the uplink data channel. Furthermore, the method includes transmitting the first UL RS with the first transmit power. The method also includes transmitting the second UL RS with the second transmit power.

BRIEF DESCRIPTION OF THE DRAWINGS

FIG. 5 is a diagram illustrating three types of beamforming according to one exemplary embodiment.

FIG. 6 is a reproduction of Table 5.1.1.1-1 of 3GPP TS 36.213 v13.2.0.

FIG. 7A is a reproduction of Table 5.1.1.1-2 of 3GPP TS 36.213 v13.2.0.

FIG. 7B is reproduction of Table 5.1.1.1-3 of 3GPP TS 36.213 v13.2.0.

FIG. 8 is a reproduction of Table 5.1.2.1-1 of 3GPP TS 36.213 v13.2.0.

FIG. 9 is a reproduction of Table 5.1.2.1-2 of 3GPP TS 36.213 v13.2.0.

FIG. 10 is a reproduction of Table 7.2.3-0 of 3GPP TS 36.213 v13.2.0.

FIG. 11 is a reproduction of Table 7.2.3-1 of 3GPP TS 36.213 v13.2.0.

FIG. 12 is a reproduction of Table 7.2.3-2 of 3GPP TS 36.213 v13.2.0.

FIG. 13 is a reproduction of Table 7.2.3-3 of 3GPP TS 36.213 v13.2.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia and Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; RP-150465, "New SI proposal: Study on Latency reduction techniques for LTE", Ericsson and Huawei; and TS 36.213 v13.2.0, "E-UTRA; Physical layer procedures (Release 13)." The standards and documents listed above are hereby expressly incorporated by reference in their entirety.

Figure 1:
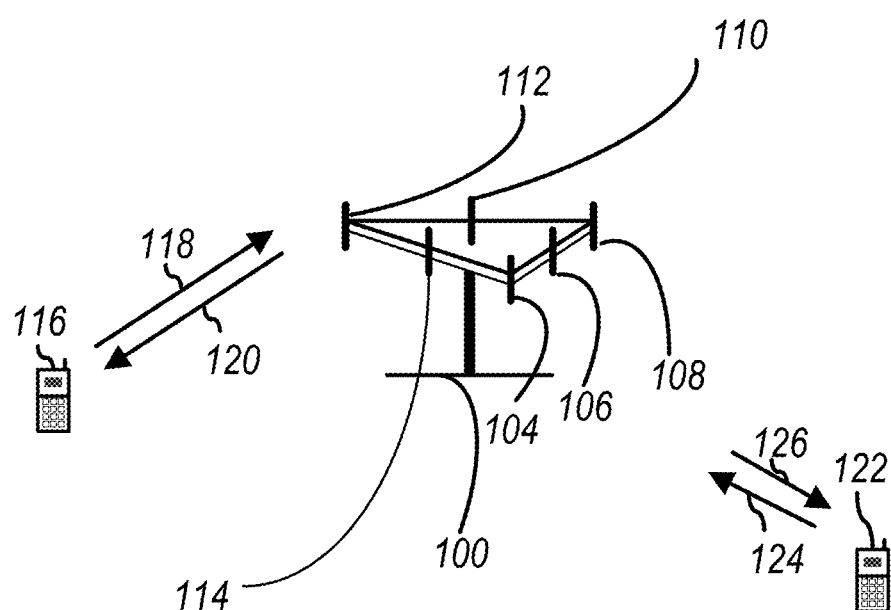
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
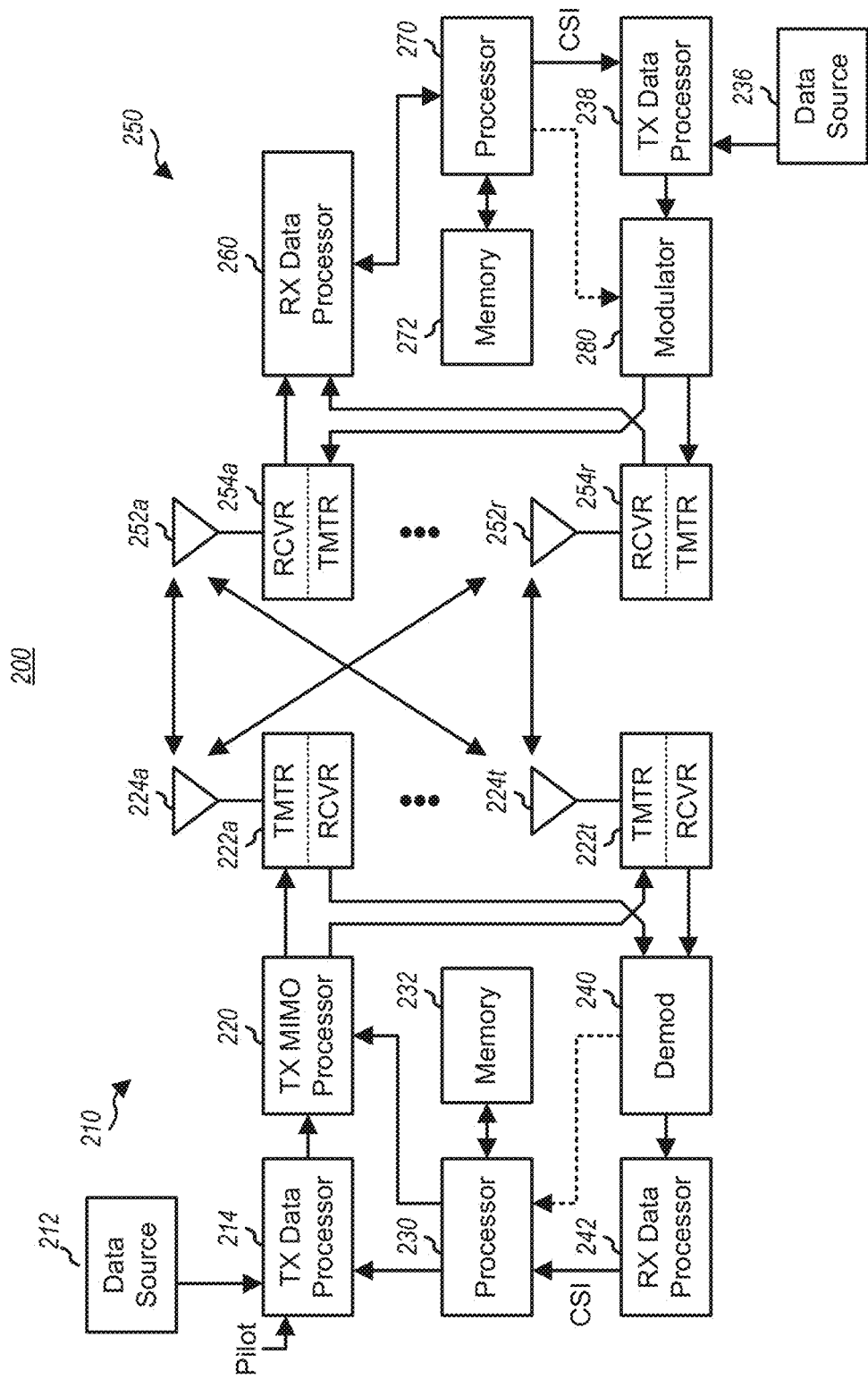
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
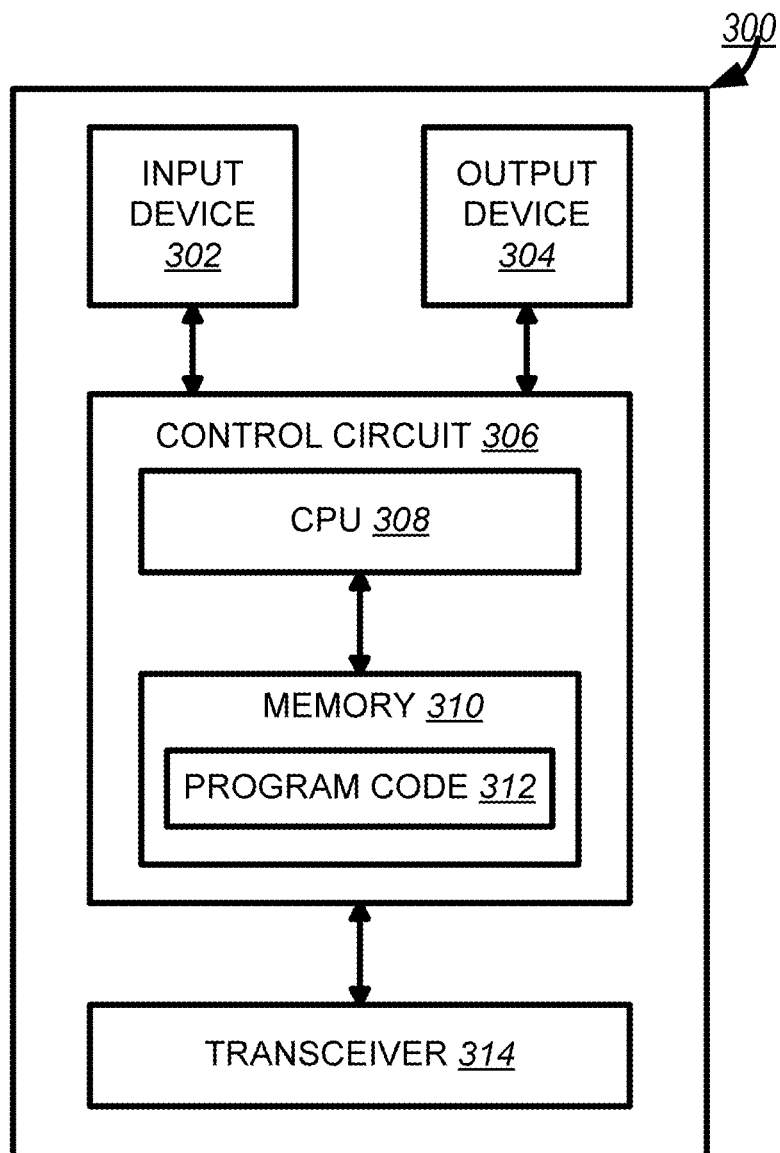
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
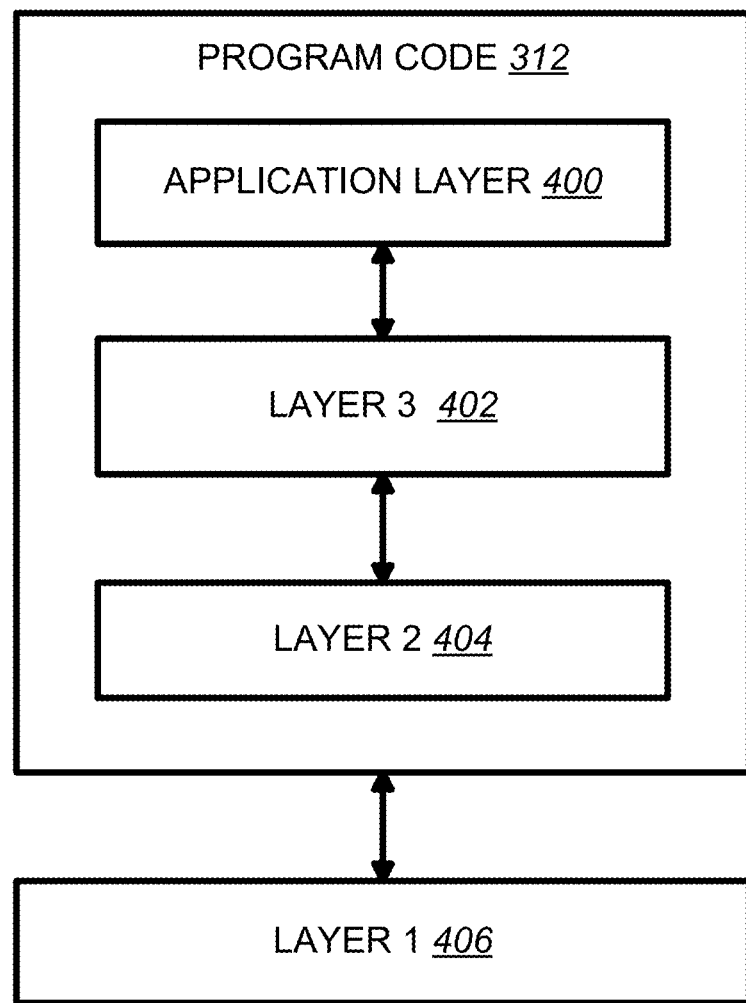
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As described in 3GPP R2-162366, in lower frequency bands (e.g., current LTE bands <6 GHz), the required cell coverage may be provided by forming a wide sector beam for transmitting downlink common channels. However, in utilizing wide sector beam on higher frequencies (>>6 GHz), the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

Because the high gain beams are narrow compared to a wide sector beam, multiple beams for transmitting downlink common channels are needed to cover the required cell area. The number of concurrent high gain beams that an access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

As described in 3GPP R2-163716, beamforming is generally a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be generally categorized into three types of implementation: digital beamforming, hybrid beamforming, and analog beamforming. For digital beamforming, the beam is generated on the digital domain, i.e., the weighting of each antenna element can be controlled by baseband (e.g., connected to a TXRU (Transceiver Unit)). Therefore it is very easy to tune the beam direction of each subband differently across the system bandwidth. Also, to change beam direction from time to time does not require any switching time between OFDM (Orthogonal Frequency Division Multiplexing) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists).

For analog beamforming, the beam is generated on the analog domain, i.e., the weighting of each antenna element can be controlled by an amplitude/phase shifter in the RF (Radio Frequency) circuit. Since the weighing is purely controlled by the circuit, the same beam direction would apply on the whole system bandwidth. Also, if beam direction is to be changed, switching time is required. The number of beam generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain. The three types of beamforming is shown in FIG. 5.

As discussed in 3GPP R2-162709, an eNB (evolved Node B) may have multiple TRPs (either centralized or distributed). Each TRP (Transmission/Reception Point) can form multiple beams. The number of beams and the number of simultaneous beams in the time/frequency domain depend on the number of antenna array elements and the RF at the TRP.

Potential mobility type for NR (New Radio) can be listed as follows:
  Intra-TRP mobility
  Inter-TRP mobility
  Inter-NR eNB mobility As discussed in 3GPP R2-162762, reliability of a system purely relying on beamforming and operating in higher frequencies might be challenging, since the coverage might be more sensitive to both time and space variations. As a consequence of that the SINR (Signal-to-Interference-and-Noise Ratio) of that narrow link can drop much quicker than in the case of LTE.

Using antenna arrays at access nodes with hundreds of elements, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

In 3GPP RAN1 #85 meeting, some agreements about beamforming are as follows:
Agreements:
  Following three implementations of beamforming are to be studied in NR
    Analog beamforming
    Digital beamforming
    Hybrid beamforming
    Note: The physical layer procedure design for NR can be agnostic to UE/TRP with respect to the beamforming implementations employed at TRP/UE, but it may pursue beamforming implementation specific optimization not to lose efficiency
  RAN1 studies both multi-beam based approaches and single-beam based approaches for these channels/signals/measurement/feedback
    Initial-access signals (synchronization signals and random access channels)

System-information delivery

RRM measurement/feedback

L1 control channel

Others are FFS

Note: The physical layer procedure design for NR can be unified as much as possible whether multi-beam or single-beam based approaches are employed at TRP at least for synchronization signal detection in stand-alone initial access procedure Note: single beam approach can be a special case of multi beam approach Note: Individual optimization of single beam approach and multiple beam approach is possible Multi-beam based approaches In Multi-beam based approaches, multiple beams are used for covering a DL coverage area and/or UL coverage distance of a TRP/a UE One example of multi-beam based approaches is beam sweeping:

When beam sweeping is applied for a signal (or a channel), the signal (the channel) is transmitted/received on multiple beams, which are on multiple time instances in finite time duration Single/multiple beam can be transmitted/received in a single time instance Others are FFS Single-beam based approaches In single-beam based approaches, the single beam can be used for covering a DL coverage area and/or UL coverage distance of a TRP/a UE, similarly as for LTE cell-specific channels/RS For both single-beam and multi-beam based approaches, RAN1 can consider followings in addition Power boosting

SFN

Repetition

Beam diversity (only for multi-beam approach)

Antenna diversity

Other approaches are not precluded

Combinations of single-beam based and multi-beam based approaches are not precluded Agreements:

RAN1 to study the beamforming procedures and their system impacts at least for multi beam based approach Physical layer procedures for beamforming optimizing different metrics such as overheads and latencies in multi beam and single beam based approaches Physical layer procedures in multi beam based approach that require beam training, i.e. steering of transmitter and/or receiver beams E.g. Periodic/Aperiodic downlink/uplink TX/RX beam sweeping signals, where periodic signals may be semi-statically or dynamically configured (FFS)

E.g. UL sounding signals

Other example is not precluded

Agreements:

Both intra-TRP and inter-TRP beamforming procedures are considered.

Beamforming procedures are considered with/without TRP beamforming/beam sweeping and with/without UE beamforming/beam sweeping, according to the following potential use cases:

UE movement, UE rotation, beam blocking:

Change of beam at TRP, same beam at UE

Same beam at TRP, change of beam at UE

Change of beam at TRP, change of beam at UE

Other cases are not precluded

With the support of beam operation and TRP, a cell may have multiple choices to schedule a UE. For example, there may be multiple beams from a TRP transmitting the same data to the UE, which can provide more reliability for the transmission. Alternatively, multiple beams from multiple TRPs transmit the same data to the UE. To increase the throughput, it is also possible for a single TRP to transmit different data on different beams for the UE. Also, multiple TRPs can transmit different data on different beams to the UE.

In LTE system, the UL transmit power is determined by multiple factors wherein one of the factors is the DL pathloss. The pathloss is derived from CRS measurement. Besides, in legacy LTE or LTE-A, the transmit power of DM RS is tied to the corresponding UL transmission, for instance PUSCH (Physical Uplink Shared Channel) or PUCCH (Physical Uplink Control Channel). The transmit power for SRS (Sounding Reference Signal) is tied to the PUSCH for eNB to measure UL channel. More detail information can be found in Section 5 of 3GPP TS 36.213 as follows:

5 Power Control

Downlink power control determines the Energy Per Resource Element (EPRE). The term resource element energy denotes the energy prior to CP insertion. The term resource element energy also denotes the average energy taken over all constellation points for the modulation scheme applied. Uplink power control determines the average power over a SC-FDMA symbol in which the physical channel is transmitted.

5.1 Uplink Power Control

Uplink power control controls the transmit power of the different uplink physical channels. For PUSCH, the transmit power $\hat{P}_{PUSCH,c}(i)$ defined in subclause 5.1.1, is first scaled by the ratio of the number of antennas ports with a non-zero PUSCH transmission to the number of configured antenna ports for the transmission scheme. The resulting scaled power is then split equally across the antenna ports on which the non-zero PUSCH is transmitted.

For PUCCH or SRS, the transmit power $\hat{P}_{PUCCH}(i)$, defined in subclause 5.1.1.1, or $\hat{P}_{SRS,c}(i)$ is split equally across the configured antenna ports for PUCCH or SRS. $\hat{P}_{SRS,c}(i)$ is the linear value of $\hat{P}_{SRS,c}(i)$ defined in subclause 5.1.3.

A cell wide overload indicator (OI) and a High Interference Indicator (HII) to control UL interference are defined in [9].

For a serving cell with frame structure type 1, a UE is not expected to be configured with UplinkPowerControlDedicated-v12x0.

5.1.1 Physical Uplink Shared Channel

If the UE is configured with a SCG, the UE shall apply the procedures described in this clause for both MCG and SCG When the procedures are applied for MCG, the terms 'secondary cell', 'secondary cells', 'serving cell', 'serving cells' in this clause refer to secondary cell, secondary cells, serving cell, serving cells belonging to the MCG respectively.

When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

If the UE is configured with a PUCCH-SCell, the UE shall apply the procedures described in this clause for both primary PUCCH group and secondary PUCCH group When the procedures are applied for primary PUCCH group, the terms 'secondary cell', 'secondary cells', 'serving cell', 'serving cells' in this clause refer to secondary cell, secondary cells, serving cell, serving cells belonging to the primary PUCCH group respectively.

When the procedures are applied for secondary PUCCH group, the terms 'secondary cell', 'secondary cells', 'serving cell', 'serving cells' in this clause refer to secondary cell, secondary cells, serving cell, serving cells belonging to the secondary PUCCH group respectively.

5.1.1.1 UE Behaviour

The setting of the UE Transmit power for a Physical Uplink Shared Channel (PUSCH) transmission is defined as follows.

If the UE transmits PUSCH without a simultaneous PUCCH for the serving cell c, then the UE transmit power $P_{PUSCH,c}(i)$ for PUSCH transmission in subframe i for the serving cell c is given by $$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c \\ + \Delta_{TF,c}(i) + f_c(i) \end{Bmatrix} \text{ [dBm]}$$

If the UE transmits PUSCH simultaneous with PUCCH for the serving cell c, then the UE transmit Power $P_{PUSCH,c}(i)$ for the PUSCH transmission in subframe i for the serving cell c is given by $$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \\ \Delta_{TF,c}(i) + f_c(i) \end{Bmatrix} \text{ [dBm]}$$

If the UE is not transmitting PUSCH for the serving cell c, for the accumulation of TPC command received with DCI format 3/3A for PUSCH, the UE shall assume that the UE transmit power $P_{PUSCH,c}(i)$ for the PUSCH transmission in subframe i for the serving cell c is computed by $$P_{PUSCH,c}(i) = \min\{P_{CMAX,c}(i), P_{O\_PUSCH,c}(1) + \alpha_c(1) \cdot PL_c + f_c(i)\} \text{ [dBm]}$$

where, $\hat{P}_{CMAX,c}(i)$ is the configured UE transmit power defined in [6] in subframe i for serving cell c and $\hat{P}_{CMAX,c}(i)$ is the linear value of $P_{CMAX,c}(i)$. If the UE transmits PUCCH without PUSCH in subframe i for the serving cell c, for the accumulation of TPC command received with DCI format 3/3A for PUSCH, the UE shall assume $P_{CMAX,c}(i)$ as given by subclause 5.1.2.1. If the UE does not transmit PUCCH and PUSCH in subframe i for the serving cell c, for the accumulation of TPC command received with DCI format 3/3A for PUSCH, the UE shall compute $P_{CMAX,c}(i)$ assuming MPR=0 dB, A-MPR=0 dB, P-MPR=0 dB and ⏃ $T_C$=0 dB, where MPR, A-MPR, P-MPR and ⏃ $T_C$ are defined in [6].

$\hat{P}_{PUCCH}(i)$ is the linear value of $P_{PUCCH}(i)$ defined in subclause 5.1.2.1

$M_{PUSCH,c}(i)$ is the bandwidth of the PUSCH resource assignment expressed in number of resource blocks valid for subframe i and serving cell c.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12, when j=0, $P_{O\_PUSCH,c}(0) = P_{O\_UE\_PUSCH,c,2}(0) + P_{O\_NOMLNAL\_PUSCH,c,2}(0)$, where j=0 is used for PUSCH (re)transmissions corresponding to a semi-persistent grant. $P_{O\_UE\_PUSCH,c,2}(0)$ and $P_{O\_NOMINAL\_PUSCH,c,2}(0)$ are the parameters p0-UE-PUSCH-Persistent-SubframeSet2-r12 and p0-NominalPUSCH-Persistent-SubframeSet2-r12 respectively provided by higher layers, for each serving cell c.

when j=1, $P_{O\_PUSCH,c}(1) = P_{O\_UE\_PUSCH,c,2}(1) + P_{O\_NOMINAL\_PUSCH,c,2}(1)$, where j=1 is used for PUSCH (re)transmissions corresponding to a dynamic scheduled grant. $P_{O\_UE\_PUSCH,c,2}(1)$ and $P_{O\_NOMINAL\_PUSCH,c,2}(1)$ are the parameters p0-UE-PUSCH-SubframeSet2-r12 and p0-Nominal-PUSCH-SubframeSet2-r12 respectively, provided by higher layers for serving cell c.

when j=2, $P_{O\_PUSCH,c}(s) = P_{O\_UE\_PUSCH,c}(2) + P_{O\_NOMLNAL\_PUSCH,c}(2)$ where $P_{O\_UE\_PUSCH,c}(2) = 0$ and $P_{O\_NOMINAL\_PUSCH,c}(2) = P_{O\_PRE} + \Delta_{PREAMBLE\_Msg3}$, where the parameter preambleInitialReceivedTargetPower [8] ($P_{O\_PRE}$) and $\Delta_{PREAMBLE\_Msg3}$ are signalled from higher layers for serving cell c, where j=2 is used for PUSCH (re) transmissions corresponding to the random access response grant.

Otherwise $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH,c}(2) = 0$ and $P_{O\_NOMINAL\_PUSCH,c}(2) = P_{O\_PRE} + \Delta_{PREAMBLE\_Msg3}$, where the parameter preambleInitialReceivedTargetPower [8] ($P_{O\_PRE}$) and $\Delta_{PREAMBLE\_Msg3}$ are signalled from higher layers for serving cell c.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12, For j=0 or 1, $\alpha_c(j) = \alpha_{c,2} \in \{0, 0.4, 0.5, 0.6, 0.7, 0.8, 0.9, 1\}$. $\alpha_{c,2}$ is the parameter alpha-SubframeSet2-r12 provided by higher layers for each serving cell c.

For j=2, $\alpha_c(j) = 1$.

Otherwise
- For j=0 or 1, $\alpha_c \in \{0, 0.4, 0.5, 0.6, 0.7, 0.8, 0.9, 1\}$ is a 3-bit parameter provided by higher layers for serving cell c. For j=2, $\alpha_c(j)=1$.
- $PL_c$ is the downlink path loss estimate calculated in the UE for serving cell c in dB and $PL_c$=referenceSignalPower higher layer filtered RSRP, where referenceSignalPower is provided by higher layers and RSRP is defined in [5] for the reference serving cell and the higher layer filter configuration is defined in [11] for the reference serving cell.
  - If serving cell c belongs to a TAG containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlossReferenceLinking defined in [11] is used as the reference serving cell for determining referenceSignalPower and higher layer filtered RSRP.
  - If serving cell c belongs to a TAG containing the PSCell then, for the uplink of the PSCell, the PSCell is used as the reference serving cell for determining referenceSignalPower and higher layer filtered RSRP; for the uplink of the secondary cell other than PSCell, the serving cell configured by the higher layer parameter pathlossReferenceLinking defined in [11] is used as the reference serving cell for determining referenceSignalPower and higher layer filtered RSRP.
  - If serving cell c belongs to a TAG not containing the primary cell or PSCell then serving cell c is used as the reference serving cell for determining referenceSignalPower and higher layer filtered RSRP.
- $\Delta_{TF,c}(i) = 10 \log_{10}((2^{BPRE \cdot K_s} - 1) \cdot \beta_{offset}^{PUSCH})$ for $K_s = 1.25$ and 0 for $K_s = 0$ where $K_s$ is given by the parameter deltaMCS-Enabled provided by higher layers for each serving cell c. BPRE and $\beta_{offset}^{PUSCH}$, for each serving cell c, are computed as below. $K_s = 0$ for transmission mode 2.
  - BPRE=$O_{CQI}/N_{RE}$ for control data sent via PUSCH without UL-SCH data and $$\sum_{r=0}^{C-1} K_r / N_{RE}$$

for other cases.
    - where c is the number of code blocks, $K_r$ is the size for code block r, $O_{CQI}$ is the number of CQI/PMI bits including CRC bits and $N_{RE}$ is the number of resource elements determined as $N_{RE} = M_{sc}^{PUSCH-initial} \cdot N_{symb}^{PUSCH-initial}$, where C, $K_r$, $M_{sc}^{PUSCH-intitial}$ and $N_{symb}^{PUSCH-initial}$ are defined in [4].
  - $\beta_{offset}^{PUSCH} = \beta_{offset}^{CQI}$ for control data sent via PUSCH without UL-SCH data and 1 for other cases.
- $\delta_{PUSCH,c}$ is a correction value, also referred to as a TPC command and is included in PDCCH/EPDCCH with DCI format 0/4 or in MPDCCH with DCI format 6-0A for serving cell c or jointly coded with other TPC commands in PDCCH/MPDCCH with DCI format 3/3A whose CRC parity bits are scrambled with TPC-PUSCH-RNTI. If the UE is configured with higher layer parameter UplinkPowerControlDedicated-v12x0 for serving cell c and if subframe i belongs to uplink power control subframe set 2 as indicated by the higher layer parameter tpc-SubframeSet-r12, the current PUSCH power control adjustment state for serving cell c is given by $f_{c,2}(i)$, and the UE shall use $f_{c,2}(i)$ instead of $f_c(i)$ to determine $P_{PUSCH,c}(i)$. Otherwise, the current PUSCH power control adjustment state for serving cell c is given by $f_c(i)$. $f_{c,2}(i)$ and $f_c(i)$ are defined by:
  - $f_c(i) = f_c(i-1) + \delta_{PUSCH,c}(i - K_{PUSCH})$ and $f_{c,2}(i) = f_{c,2}(i-1) + \delta_{PUSCH,c}(i - K_{PUSCH})$ if accumulation is enabled based on the parameter Accumulation-enabled provided by higher layers or if the TPC command $\delta_{PUSCH,c}$ is included in a PDCCH/EPDCCH with DCI format 0 or in a MPDCCH with DCI format 6-0A for serving cell c where the CRC is scrambled by the Temporary C-RNTI
    - where $\delta_{PUSCH,c}(i - K_{PUSCH})$ was signalled on PDCCH/EPDCCH with DCI format 0/4 or MPDCCH with DCI format 6-0A or PDCCH/MPDCCH with DCI format 3/3A on subframe $i - K_{PUSCH}$, and where $f_c(0)$ is the first value after reset of accumulation. For a BL/CE UE configured with CEModeA, subframe $i - K_{PUSCH}$ is the last subframe in which the MPDCCH with DCI format 6-0A or MPDCCH with DCI format 3/3A is transmitted.
  - The value of $K_{PUSCH}$ is
    - For FDD or FDD-TDD and serving cell frame structure type 1, $K_{PUSCH} = 4$
    - For TDD, if the UE is configured with more than one serving cell and the TDD UL/DL configuration of at least two configured serving cells is not the same, or if the UE is configured with the parameter EIMTA-MainConfigServCell-r12 for at least one serving cell, or for FDD-TDD and serving cell frame structure type 2, the "TDD UL/DL configuration" refers to the UL-reference UL/DL configuration (defined in subclause 8.0) for serving cell c.
    - For TDD UL/DL configurations 1-6, $K_{PUSCH}$ is given in Table 5.1.1.1-1
    - For TDD UL/DL configuration 0
      - If the PUSCH transmission in subframe 2 or 7 is scheduled with a PDCCH/EPDCCH of DCI format 0/4 or a MPDCCH of DCI format 6-0A in which the LSB of the UL index is set to 1, $K_{PUSCH} = 7$
      - For all other PUSCH transmissions, $K_{PUSCH}$ is given in Table 5.1.1.1-1.
  - For serving cell c and a non-BL/CE UE, the UE attempts to decode a PDCCH/EPDCCH of DCI format 0/4 with the UE's C-RNTI or DCI format 0 for SPS C-RNTI and a PDCCH of DCI format 3/3A with this UE's TPC-PUSCH-RNTI in every subframe except when in DRX or where serving cell c is deactivated.
  - For serving cell c and a BL/CE UE configured with CEModeA, the UE attempts to decode a MPDCCH of DCI format 6-0A with the UE's C-RNTI or SPS C-RNTI and a MPDCCH of DCI format 3/3A with this UE's TPC-PUSCH-RNTI in every BL/CE downlink subframe except when in DRX
  - For a non-BL/CE UE, if DCI format 0/4 for serving cell sand DCI format 3/3A are both detected in the same subframe, then the UE shall use the $\delta_{PUSCH,c}$ provided in DCI format 0/4.

For a BL/CE UE configured with CEModeA, if DCI format 6-0A for serving cell s and DCI format 3/3A are both detected in the same subframe, then the UE shall use the $\delta_{PUSCH,c}$ provided in DCI format 6-0A.

$\Delta_{PUSCH,c}$=0 dB for a subframe where no TPC command is decoded for serving cell c or where DRX occurs or i is not an uplink subframe in TDD or FDD-TDD and serving cell c frame structure type 2.

The $\delta_{PUSCH,c}$ dB accumulated values signalled on PDCCH/EPDCCH with DCI format 0/4 or MPDCCH with DCI format 6-0A are given in Table 5.1.1.1-2. If the PDCCH/EPDCCH with DCI format 0 or MPDCCH with DCI format 6-0A is validated as a SPS activation or release PDCCH/EPDCCH/MPDCCH, then $\delta_{PUSCH,}$ is 0 dB.

The $\delta_{PUSCH}$ dB accumulated values signalled on PDCCH/MPDCCH with DCI format 3/3A are one of SET1 given in Table 5.1.1.1-2 or SET2 given in Table 5.1.1.1-3 as determined by the parameter TPC-Index provided by higher layers.

If UE has reached $P_{CMAX,c}(i)$ for serving cell c, positive TPC commands for serving cell c shall not be accumulated If UE has reached minimum power, negative TPC commands shall not be accumulated If the UE is not configured with higher layer parameter UplinkPowerControlDedicated-v12x0 for serving cell c, the UE shall reset accumulation
For serving cell c, when $P_{O\_UE\_PUSCH,c}$ value is changed by higher layers
For serving cell c, when the UE receives random access response message for serving cell c If the UE is configured with higher layer parameter UplinkPowerControlDedicated-v12x0 for serving cell c,
the UE shall reset accumulation corresponding to $f_c(*)$ for serving cell c
when $P_{O\_UE\_PUSCH,c}$ value is changed by higher layers
when the UE receives random access response message for serving cell c
the UE shall reset accumulation corresponding to $f_{c,2}(*)$ for serving cell c
when $P_{O\_UE\_PUSCH,c,2}$ value is changed by higher layers If the UE is configured with higher layer parameter UplinkPowerControlDedicated-v12x0 for serving cell c and
if subframe i belongs to uplink power control subframe set 2 as indicated by the higher layer parameter tpc-SubframeSet-r12 $f_c(i)=f_c(i-1)$
if subframe i does not belong to uplink power control subframe set 2 as indicated by the higher layer parameter tpc-SubframeSet-r12 $f_{c,2}(i)=f_{c,2}(i-1)$ $f_c(i)=\delta_{PUSCH,c}(i-K_{PUSCH})$ and $f_{c,2}=\delta_{PUSCH,c}(i-K_{PUSCH})$ if accumulation is not enabled for serving cell c based on the parameter Accumulation-enabled provided by higher layers
where $\delta_{PUSCH,c}(i-K_{PUSCH})$ was signalled on PDCCH/EPDCCH with DCI format 0/4 or MPDCCH with DCI format 6-0A for serving cell c on subframe $i-K_{PUSCH}$. For a BL/CE UE configured with CEModeA, subframe $i-K_{PUSCH}$ is the last subframe in which the MPDCCH with DCI format 6-0A or MPDCCH with DCI format 3/3A is transmitted.

The value of $K_{PUSCH}$ is
For FDD or FDD-TDD and serving cell frame structure type 1, $K_{PUSCH}=4$
For TDD, if the UE is configured with more than one serving cell and the TDD UL/DL configuration of at least two configured serving cells is not the same, or if the UE is configured with the parameter EIMTA-MainConfigServCell-r12 for at least one serving cell, or FDD-TDD and serving cell frame structure type 2, the "TDD UL/DL configuration" refers to the UL-reference UL/DL configuration (defined in sub-clause 8.0) for serving cell c.
For TDD UL/DL configurations 1-6, $K_{PUSCH}$ is given in Table 5.1.1.1-1.
For TDD UL/DL configuration 0
If the PUSCH transmission in subframe 2 or 7 is scheduled with a PDCCH/EPDCCH of DCI format 0/4 or a MPDCCH with DCI format 6-0A in which the LSB of the UL index is set to 1, $K_{PUSCH}=7$
For all other PUSCH transmissions, $K_{PUSCH}$ is given in Table 5.1.1.1-1.

The $\delta_{PUSCH,c}$ dB absolute values signalled on PDCCH/EPDCCH with DCI format 0/4 or a MPDCCH with DCI format 6-0A are given in Table 5.1.1.1-2. If the PDCCH/EPDCCH with DCI format 0 or a MPDCCH with DCI format 6-0A is validated as a SPS activation or release PDCCH/EPDCCH/MPDCCH, then $\delta_{PUSCH,c}$ is 0 dB.

for a non-BL/CE UE, $f_c(i)=f_c(i-1)$ and $f_{c,2}(i)=f_{c,2}(i-1)$ for a subframe where no PDCCH/EPDCCH with DCI format 0/4 is decoded for serving cell c or where DRX occurs or i is not an uplink subframe in TDD or FDD-TDD and serving cell c frame structure type 2.

for a BL/CE UE configured with CEModeA, $f_c(i)=f_c(i-1)$ and $f_{c,2}(i)=f_{c,2}(i-1)$ for a subframe where no MPDCCH with DCI format 6-0A is decoded for serving cell c or where DRX occurs or i is not an uplink subframe in TDD.

If the UE is configured with higher layer parameter UplinkPowerControlDedicated-v12x0 for serving cell c and
if subframe i belongs to uplink power control subframe set 2 as indicated by the higher layer parameter tpc-SubframeSet-r12 $f_c(i)=f_c(i-1)$
if subframe i does not belong to uplink power control subframe set 2 as indicated by the higher layer parameter tpc-SubframeSet-r12 $f_{c,2}(i)=f_{c,2}(i-1)$ For both types of $f_c(*)$ (accumulation or current absolute) the first value is set as follows:
If $P_{O\_UE\_PUSCH,c}$ value is changed by higher layers and serving cell c is the primary cell or, if $P_{O\_UE\_PUSCH,c}$ value is received by higher layers and serving cell c is a Secondary cell
$f_c(0)=0$
Else
If the UE receives the random access response message for a serving cell c $f_c(0) = \Delta P_{rampup,c} + \delta_{msg2,c}$, where
$\delta_{msg2,c}$ is the TPC command indicated in the random access response corresponding to the random access preamble transmitted in the serving cell c, see subclause 6.2, and $$\Delta P_{rampup,c} = \min\left[\left\{\max\left(0, P_{CMAX,c} - \begin{pmatrix} 10\log_{10}(M_{PUSCH,c}(0)) + \\ P_{O\_PUSCH,c}(2) + \delta_{msg2} + \\ \alpha_c(2) \cdot PL + \Delta_{TF,c}(0) \end{pmatrix}\right)\right\}, P_{rampuprequested,c}\right]$$

and $\Delta P_{rampuprequested,c}$ is provided by higher layers and corresponds to the total power ramp-up requested by higher layers from the first to the last preamble in the serving cell c, $M_{PUSCH,c}(0)$ is the bandwidth of the PUSCH resource assignment expressed in number of resource blocks valid for the subframe of first PUSCH transmission in the serving cell c, and $\Delta_{TF,c}(0)$ is the power adjustment of first PUSCH transmission in the serving cell c.

If $P_{O\_UE\_PUSCH,c,2}$ value is received by higher layers for a serving cell c.
$f_{c,2} = 0$ Table 5.1.1.1-1 of 3GPP TS 36.213 v13.2.0,
Entitled "$K_{PUSCH}$ for TDD Configuration 0-6", is Reproduced as FIG. 6

Table 5.1.1.1-2 of 3GPP TS 36.213 v13.2.0,
Entitled "Mapping of TPC Command Field in DCI Format 0/3/4 to Absolute and Accumulated $\delta_{PUSCH,c}$ Values", is Reproduced as FIG. 7A Table 5.1.1.1-3 of 3GPP TS 36.213 v13.2.0,
Entitled "Mapping of TPC Command Field in DCI Format 3A to Accumulated $\delta_{PUSCH,c}$ Values", is Reproduced as FIG. 7B

[ . . . ]

5.1.2 Physical Uplink Control Channel

If the UE is configured with a SCG, the UE shall apply the procedures described in this subclause for both MCG and SCG.

When the procedures are applied for MCG, the term 'serving cell' in this subclause refers to serving cell belonging to the MCG.

When the procedures are applied for SCG, the term 'serving cell' in this subclause refers to serving cell belonging to the SCG. The term 'primary cell' in this subclause refers to the PSCell of the SCG. If the UE is configured with a PUCCH-SCell, the UE shall apply the procedures described in this subclause for both primary PUCCH group and secondary PUCCH group.

When the procedures are applied for the primary PUCCH group, the term 'serving cell' in this subclause refers to serving cell belonging to the primary PUCCH group.

When the procedures are applied for the secondary PUCCH group, the term 'serving cell' in this subclause refers to serving cell belonging to the secondary PUCCH group. The term 'primary cell' in this subclause refers to the PUCCH-SCell of the secondary PUCCH group.

5.1.2.1 UE Behaviour

If serving cell c is the primary cell, for PUCCH format 1/1a/1b/2/2a/2b/3, the setting of the UE Transmit power $P_{PUCCH}$ for the physical uplink control channel (PUCCH) transmission in subframe i for serving cell c is defined by $$P_{PUCCH}(i) = \min\left\{\begin{matrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{matrix}\right\} \text{ [dBm]}$$

If serving cell c is the primary cell, for PUCCH format 4/5, the setting of the UE Transmit power $P_{PUCCH}$ for the physical uplink control channel (PUCCH) transmission in subframe i for serving cell c is defined by $$P_{PUCCH}(i) = \min\left\{\begin{matrix} P_{CMAX,c}(i), \\ P_{0\_PUCCH} + PL_c + 10\log_{10}(M_{PUCCH,c},(i)) + \\ \Delta_{TF,c}(i) + \Delta_{F\_PUCCH}(F) + g(i) \end{matrix}\right\} \text{ [dBm]}$$

If the UE is not transmitting PUCCH for the primary cell, for the accumulation of TPC command for PUCCH, the UE shall assume that the UE transmit power $P_{PUCCH}$ for PUCCH in subframe i is computed by $$P_{PUCCH}(i) = \min\{P_{CMAX,c}(i), P_{0\_PUCCH} + PL_c + g(i)\} \text{ [dBm]}$$

where $P_{CMAX,c}(i)$ is the configured UE transmit power defined in [6] in subframe i for serving cell c. If the UE transmits PUSCH without PUCCH in subframe i for the serving cell c, for the accumulation of TPC command for PUCCH, the UE shall assume $P_{CMAX,c}(i)$ as given by subclause 5.1.1.1. If the UE does not transmit PUCCH and PUSCH in subframe i for the serving cell c, for the accumulation of TPC command for PUCCH, the UE shall compute $P_{CMAX,c}(i)$ assuming MPR=0 dB, A-MPR=0 dB, P-MPR=0 dB and ⊵ $T_C$=0 dB, where MPR, A-MPR, P-MPR and ⊵ $T_C$ are defined in [6].

The parameter $\Delta_{F\_PUCCH}(F)$ is provided by higher layers. Each $\Delta_{F\_PUCCH}(F)$ value corresponds to a PUCCH format (F) relative to PUCCH format 1a, where each PUCCH format (F) is defined in Table 5.4-1 of [3].

If the UE is configured by higher layers to transmit PUCCH on two antenna ports, the value of $\Delta_{TxD}(F')$ is provided by higher layers where each PUCCH format F' is defined in Table 5.4-1 of [3]; otherwise, $\Delta_{TxD}(F')=0$.

$h(n_{CQI}, n_{HARQ}, n_{SR})$ is a PUCCH format dependent value, where $n_{CQI}$ corresponds to the number of information bits for the channel quality information defined in subclause 5.2.3.3 in [4]. $n_{SR}=1$ if subframe i is configured for SR for the UE not having any associated transport block for UL-SCH, otherwise $n_{SR}=0$. If the UE is configured with more than one serving cell, or the UE is configured with one serving cell and transmitting using PUCCH format 3, the value of $n_{HARQ}$ is defined in subclause 10.1; otherwise, $n_{HARQ}$ is the number of HARQ-ACK bits sent in subframe i.

For PUCCH format 1,1a and 1b $h(n_{CQI}, n_{HARQ}, n_{SR})=0$
For PUCCH format 1b with channel selection, if the UE is configured with more than one serving cell, $$h(n_{CQI}, n_{HARQ}, n_{SR}) = \frac{(n_{HARQ} - 1)}{2},$$

otherwise, $h(n_{CQI}, n_{HARQ}, n_{SR})=0$
For PUCCH format 2, 2a, 2b and normal cyclic prefix $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases}$$

For PUCCH format 2 and extended cyclic prefix $$h(n_{CQI}, n_{HARQ}, n_{SR}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

For PUCCH format 3 and when UE transmits HARQ-ACK/SR without periodic CSI,
If the UE is configured by higher layers to transmit PUCCH format 3 on two antenna ports, or if the UE transmits more than 11 bits of HARQ-ACK/SR $$h(n_{CQI}, n_{HARQ}, n_{SR}) = \frac{n_{HARQ} + n_{SR} - 1}{3}$$

Otherwise $$h(n_{CQI}, n_{HARQ}, n_{SR}) = \frac{n_{HARQ} + n_{SR} - 1}{2}$$

For PUCCH format 3 and when UE transmits HARQ-ACK/SR and periodic CSI,
If the UE is configured by higher layers to transmit PUCCH format 3 on two antenna ports, or if the UE transmits more than 11 bits of HARQ-ACK/SR and CSI $$h(n_{CQI}, n_{HARQ}, n_{SR}) = \frac{n_{HARQ} + n_{SR} + n_{CQI} - 1}{3}$$

Otherwise $$h(n_{CQI}, n_{HARQ}, n_{SR}) = \frac{n_{HARQ} + n_{SR} + n_{CQI} - 1}{2}$$

For PUCCH format 4, $M_{PUCCH,c}(i)$ is the bandwidth of the PUCCH format 4 expressed in number of resource blocks valid for subframe i and serving cell c. For PUCCH format 5, $M_{PUCCH,c}(i)=1$.
$\Delta_{TF,c}(i)=10 \log_{10}(2^{1.25 \cdot BPRE(i)}-1)$ where $BPRE(i)=O_{UCI}(i)/N_{RE}(i)$,
$O_{UCI}(i)$ is the number of HARQ-ACK/SR/RI/CQI/PMI bits including CRC bits transmitted on PUCCH format 4/5 in subframe i;

$N_{RE}(i)=M_{PUCCH,c}(i) \cdot N_{sc}^{RB} \cdot N_{symb}^{PUCCH}$ for PUCCH format 4 and $N_{RE}(i)=N_{sc}^{RB} \cdot N_{symb}^{PUCCH}/2$ for PUCCH format 5;
$N_{symb}^{PUCCH}=2 \cdot (N_{symb}^{UL}-1)-1$ if shortened PUCCH format 4 or shortened PUCCH format 5 is used in subframe i and $n_{symb}^{PUCCH}=2 \cdot (N_{symb}^{UL}-1)$ otherwise.

$P_{O\_PUCCH}$ is a parameter composed of the sum of a parameter $P_{O\_NOMINAL\_PUCCH}$ provided by higher layers and a parameter $P_{O\_UE\_PUCCH}$ provided by higher layers.

$\delta_{PUCCH}$ is a UE specific correction value, also referred to as a TPC command, included in a PDCCH with DCI format 1A/1B/1D/1/2A/2/2B/2C/2D for the primary cell, or included in a MPDCCH with DCI format 6-1A, or included in an EPDCCH with DCI format 1A/1B/1D/1/2A/2/2B/2C/2D for the primary cell, or sent jointly coded with other UE specific PUCCH correction values on a PDCCH/MPDCCH with DCI format 3/3A whose CRC parity bits are scrambled with TPC-PUCCH-RNTI.

For a non-BL/CE UE, if the UE is not configured for EPDCCH monitoring, the UE attempts to decode a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI on every subframe except when in DRX.

If a UE is configured for EPDCCH monitoring, the UE attempts to decode
a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI as described in subclause 9.1.1, and
one or several EPDCCHs of DCI format 1A/1B/1D/1/2A/2/2B/2C/2D with the UE's C-RNTI or SPS C-RNTI, as described in subclause 9.1.4.

For a BL/CE UE configured with CEModeA, the UE attempts to decode a MPDCCH of DCI format 3/3A with the UE's TPC-PUCCH-RNTI and MPDCCH of DCI format 6-1A with the UE's C-RNTI or SPS C-RNTI on every BL/CE downlink subframe except when in DRX.

If the UE decodes
a PDCCH with DCI format 1A/1B/1D/1/2A/2/2B/2C/2D or
an EPDCCH with DCI format 1A/1B/1D/1/2A/2/2B/2C/2D or
an MPDCCH with DCI format 6-1A
for the primary cell and the corresponding detected RNTI equals the C-RNTI or SPS C-RNTI of the UE and the TPC field in the DCI format is not used to determine the PUCCH resource as in subclause 10.1, the UE shall use the $\delta_{PUCCH}$ provided in that PDCCH/EPDCCH/M PDCCH.
Else
if the UE decodes a PDCCH/MPDCCH with DCI format 3/3A, the UE shall use the $\delta_{PUCCH}$ provided in that PDCCH/MPDCCH
else the UE shall set $\delta_{PUCCH}=0$ dB.

$$g(i) = g(i-1) + \sum_{m=0}^{M-1} \delta_{PUCCH}(i - k_m)$$

where g(i) is the current PUCCH power control adjustment state and where g(0) is the first value after reset.

For FDD or FDD-TDD and primary cell frame structure type 1, M=1 and $k_0$=4.

For TDD, values of M and $k_m$ are given in Table 10.1.3.1-1, where the "UL/DL configuration" in Table 10.1.3.1-1 corresponds to the eimta-HARQ-ReferenceConfig-r12 for the primary cell when the UE is configured with the parameter EIMTA-MainConfigServCell-r12 for the primary cell.

The $\delta_{PUCCH}$ dB values signalled on PDCCH with DCI format 1A/1B/1D/1/2A/2/2B/2C/2D or EPDCCH with DCI format 1A/1B/1D/1/2A/2/2B/2C/2D or MPDCCH with DCI format 6-1A are given in Table 5.1.2.1-1. If the PDCCH with DCI format 1/1A/2/2A/2B/2C/2D or EPDCCH with DCI format 1/1A/2/2A/2B/2C/2D or MPDCCH with DCI format 6-1A is validated as an SPS activation PDCCH/EPDCCH/MPDCCH, or the PDCCH/EPDCCH with DCI format 1A or MPDCCH with DCI format 6-1A is validated as an SPS release PDCCH/EPDCCH/MPDCCH, then $\delta_{PUCCH}$ is 0 dB.

The $\delta_{PUCCH}$ dB values signalled on PDCCH/MPDCCH with DCI format 3/3A are given in Table 5.1.2.1-1 or in Table 5.1.2.1-2 as semi-statically configured by higher layers.

If $P_{O\_UE\_PUCCH}$ value is changed by higher layers,
  g(0)=0
Else
  g(0)=$\Delta P_{rampup}$+$\delta_{msg2}$, where
    $\delta_{msg2}$ is the TPC command indicated in the random access response corresponding to the random access preamble transmitted in the primary cell, see subclause 6.2 and
    if UE is transmitting PUCCH in subframe $$\Delta P_{rampup} = \min\left[\left\{\max\left(0, P_{CMAX,c} - \left(\begin{array}{c} P_{0,PUCCH} \\ +PL_c + h(n_{CQI}, n_{HARQ}, n_{SR}) \\ +\Delta_{F\_PUCCH}(F) + \Delta_{TxD}(F') \end{array}\right)\right)\right\}, \Delta P_{rampuprequested}\right].$$

Otherwise,
  $\Delta P_{rampup}$=min[{max(0,$P_{CMAX,c}$−($P_{O\_PUCCH}$+$PL_c$))},$\Delta P_{rampuprequested}$] and
  $\Delta P_{rampuprequested}$ is provided by higher layers and corresponds to the total power ramp-up requested by higher layers from the first to the last preamble in the primary cell.

If UE has reached $P_{CMAX,c}$(i) for the primary cell, positive TPC commands for the primary cell shall not be accumulated.

If UE has reached minimum power, negative TPC commands shall not be accumulated.

UE shall reset accumulation
  when $P_{O\_UE\_PUCCH}$ value is changed by higher layers
  when the UE receives a random access response message for the primary cell
  g(i)=g(i−1) if i is not an uplink subframe in TDD or FDD-TDD and primary cell frame structure type 2.

For a BL/CE UE configured with CEModeA, if the PUCCH is transmitted in more than one subframe $i_0, i_1, \ldots, i_{N-1}$ where $i_0 < i_1 < \ldots < i_{N-1}$, the PUCCH transmit power in subframe $i_k$, k=0, 1, ..., N−1 is determined by $$P_{PUCCH,c}(i_k)=P_{PUCCH,c}(i_0)$$

For a BL/CE UE configured with CEModeB, the PUCCH transmit power in subframe $i_k$ is determined by $$P_{PUCCH,c}(i_k)=P_{CMAX,c}(i_0)$$

Table 5.1.2.1-1 of 3GPP TS 36.213 v13.2.0, Entitled "Mapping of TPC Command Field in DCI Format 1A/1B/1D/1/2A/2B/2C/2D/2/3 to $\delta_{PUCCH}$ Values", is Reproduced as FIG. 8

Table 5.1.2.1-2 of 3GPP TS 36.213 v13.2.0, Entitled "Mapping of TPC Command Field in DCI Format 3A to $\delta_{PUCCH}$ Values", is Reproduced as FIG. 9

5.1.3 Sounding Reference Symbol (SRS)
5.1.3.1 UE Behaviour

The setting of the UE Transmit power $P_{SRS}$ for the SRS transmitted on subframe i for serving cell c is defined by $$P_{SRS,c}(i)=\min\{P_{CMAX,c}(i), P_{SRS\_OFFSET,c}(m)+10\log_{10}(M_{SRS,c})+P_{O\_PUSCH,c}(j)+\alpha_c(j)\cdot PL_c+f_c(i)\} \text{ [dBm]}$$

where
  $P_{CMAX,c}$(i) is the configured UE transmit power defined in [6] in subframe i for serving cell c.
  $P_{SRS\_OFFSET,c}$(m) is semi-statically configured by higher layers for m=0 and m=1 for serving cell c. For SRS transmission given trigger type 0 then m=0 and for SRS transmission given trigger type 1 then m=1.
  $M_{SRS,c}$ is the bandwidth of the SRS transmission in subframe i for serving cell c expressed in number of resource blocks.
  $f_c$(i) is the current PUSCH power control adjustment state for serving cell c, see subclause 5.1.1.1.
  $P_{O\_PUSCH,c}$(j) and $\alpha_c$(j) are parameters as defined in subclause 5.1.1.1 for subframe i, where j=1.

If the UE is not configured with an SCG or a PUCCH-SCell, and if the total transmit power of the UE for the Sounding Reference Symbol in an SC-FDMA symbol would exceed $\hat{P}_{CMAX}$(i), the UE scales $\hat{P}_{SRS,c}$(i) for the serving cell c and the SC-FDMA symbol in subframe i such that the condition $$\sum_c w(i) \cdot \hat{P}_{SRS,c}(i) \leq \hat{P}_{CMAX}(i)$$

is satisfied where $\hat{P}_{SRS,c}$(i) is the linear value of $P_{SRS,c}$, $\hat{P}_{CMAX}$(i) is the linear value of $P_{CMAX}$ defined in [6] in subframe i and w(i) is a scaling factor of $\hat{P}_{SRS,c}$(i) for serving cell c where 0<w(i)≤1. Note that w(i) values are the same across serving cells.

If the UE is not configured with an SCG or a PUCCH-SCell, and if the UE is configured with multiple TAGs and the SRS transmission of the UE in an SC-FDMA symbol for a serving cell in subframe i in a TAG overlaps with the SRS transmission in another SC-FDMA symbol in subframe i for a serving cell in another TAG, and if the total transmit power of the UE for the Sounding Reference Symbol in the overlapped portion would exceed $\hat{P}_{CMAX}$(i), the UE scales $\hat{P}_{SRS,c}$ for the serving cell c and each of the overlapped SRS SC-FDMA symbols in subframe i such that the condition $$\sum_c w(i) \cdot \hat{P}_{SRS,c}(i) \le \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of $P_{CMAX}$ defined in [6] in subframe i and w(i) is a scaling factor of $\hat{P}_{SRS,c}(i)$ for serving cell c where 0<w(i)≤1. Note that w(i) values are the same across serving cells.

If the UE is configured with higher layer parameter UplinkPowerControlDedicated-v12x0 for serving cell c and if subframe i belongs to uplink power control subframe set 2 as indicated by the higher layer parameter tpc-Subframe-Set-r12, the UE shall use $f_{c,2}(i)$ instead of $f_c(i)$ to determine $P_{SRS,c}(i)$ for subframe i and serving cell c, where $f_{c,2}(i)$ is defined in subclause 5.1.1.1.

Channel state information (CSI) may comprise channel quality indicator (CQI), PMI (precoding matrix indicator), RI (rank indicator). The CSI measurement is measured from CRS or CSI-RS. As can be seen from the below quotations, CQI is an indicator of affordable modulation and coding scheme under certain assumptions, e.g., error rate target, channel condition, which is a kind of implicit feedback for the channel, which can be determined by, e.g., signal to interference and noise ratio (SINR) of certain signal.

Alternatively, CQI can also be used to indicate real channel coefficient, with possible quantization. PMI is an indicator of preferred precoding matrix in the antenna domain, which can be used to enlarge the signal quality (beamforming gain), or reduce the interference between multiple streams (layers) from different antennas to a given UE. RI is an indicator of the preferred or affordable number of streams (layers) to the UE. More detail information can be found in Section 7.2 of 3GPP TS 36.213 as follows:

7.2 UE Procedure for Reporting Channel State Information (CSI)

If the UE is configured with a PUCCH-SCell, the UE shall apply the procedures described in this clause for both primary PUCCH group and secondary PUCCH group unless stated otherwise When the procedures are applied for the primary PUCCH group, the terms 'secondary cell', 'secondary cells', 'serving cell', and 'serving cells' in this clause refer to secondary cell, secondary cells, serving cell or serving cells belonging to the primary PUCCH group respectively unless stated otherwise.

When the procedures are applied for secondary PUCCH group, the terms 'secondary cell', 'secondary cells', 'serving cell' and 'serving cells' in this clause refer to secondary cell, secondary cells (not including the PUCCH-SCell), serving cell, serving cells belonging to the secondary PUCCH group respectively unless stated otherwise. The term 'primary cell' in this clause refers to the PUCCH-SCell of the secondary PUCCH group.

The time and frequency resources that can be used by the UE to report CSI which consists of Channel Quality Indicator (CQI), precoding matrix indicator (PMI), precoding type indicator (PTI), CSI-RS resource indicator (CRI), and/or rank indication (RI) are controlled by the eNB. For spatial multiplexing, as given in [3], the UE shall determine a RI corresponding to the number of useful transmission layers. For transmit diversity as given in [3], RI is equal to one.

A non-BL/CE UE in transmission mode 8 or 9 is configured with or without PMI/RI reporting by the higher layer parameter pmi-RI-Report.

A UE in transmission mode 10 can be configured with one or more CSI processes per serving cell by higher layers.

For a UE in transmission mode 10,

If a UE is not configured with higher layer parameter eMIMO-Type, each CSI process is associated with a CSI-RS resource (defined in subclause 7.2.5) and a CSI-interference measurement (CSI-IM) resource (defined in subclause 7.2.6). A UE can be configured with up to two CSI-IM resources for a CSI process if the UE is configured with CSI subframe sets $C_{CSI,0}$ and $C_{CSI,1}$ by the higher layer parameter csi-SubFramePattern-Config-r12 for the CSI process.

If the UE is configured with higher layer parameter eMIMO-Type, and eMIMO-Type is set to 'CLASS A', each CSI process is associated with a CSI-RS resource (defined in subclause 7.2.5) and a CSI-interference measurement (CSI-IM) resource (defined in subclause 7.2.6). A UE can be configured with up to two CSI-IM resources for a CSI process if the UE is configured with CSI subframe sets $C_{CSI,0}$ and $C_{CSI,1}$ by the higher layer parameter csi-SubFramePatternConfig-r12 for the CSI process.

If the UE is configured with higher layer parameter eMIMO-Type, and eMIMO-Type is set to 'CLASS B', each CSI process is associated with one or more CSI-RS resource (defined in subclause 7.2.5) and one or more CSI-interference measurement (CSI-IM) resource (defined in subclause 7.2.6). Each CSI-RS resource is associated with a CSI-IM resource by higher layers. For a CSI process with one CSI-RS resource, a UE can be configured with CSI-IM resource for each CSI subframe sets if the UE is configured with CSI subframe sets $C_{CSI,0}$ and $C_{CSI,1}$ by the higher layer parameter csi-SubFramePatternConfig-r12 for the CSI process.

For a UE in transmission mode 10, a CSI reported by the UE corresponds to a CSI process configured by higher layers. Each CSI process can be configured with or without PMI/RI reporting by higher layer signalling.

For UE in transmission mode 9 and the UE configured with higher layer parameter eMIMO-Type, the term 'CSI process' in this subclause refers to the CSI configured for the UE.

For a UE in transmission mode 9, and if the UE is configured with higher layer parameter eMIMO-Type, and,
 eMIMO-Type is set to 'CLASS A', each CSI process is associated with a CSI-RS resource (defined in subclause 7.2.5).
 eMIMO-Type is set to 'CLASS B', each CSI process is associated with one or more CSI-RS resource (defined in subclause 7.2.5).

For a CSI process, and if a UE is configured in transmission mode 9 or 10, and UE is not configured with higher layer parameter pmi-RI-Report, and UE is configured with higher layer parameter eMIMO-Type, and eMIMO-Type is set to 'CLASS B', and the number of CSI-RS antenna ports in at least one of the one or more configured CSI-RS resource is more than one, the UE is considered to be configured without PMI reporting.

A UE is configured with resource-restricted CSI measurements if the subframe sets $C_{CSI,0}$ and $C_{CSI,1}$ are configured by higher layers.

For a serving cell with frame structure type 1, a UE is not expected to be configured with csi-SubframePatternConfig-r12.

CSI reporting is periodic or aperiodic.

A BL/CE UE configured with CEModeB is not expected to be configured with either aperiodic CSI or periodic CSI reporting.

If the UE is configured with more than one serving cell, it transmits CSI for activated serving cell(s) only.

If a UE is not configured for simultaneous PUSCH and PUCCH transmission, it shall transmit periodic CSI reporting on PUCCH as defined hereafter in subframes with no PUSCH allocation.

If a UE is not configured for simultaneous PUSCH and PUCCH transmission, it shall transmit periodic CSI reporting on PUSCH of the serving cell with smallest ServCellIndex as defined hereafter in subframes with a PUSCH allocation, where the UE shall use the same PUCCH-based periodic CSI reporting format on PUSCH.

A UE shall transmit aperiodic CSI reporting on PUSCH if the conditions specified hereafter are met. For aperiodic CQI/PMI reporting, RI reporting is transmitted only if the configured CSI feedback type supports RI reporting.

Table 7.2-1: Void

In case both periodic and aperiodic CSI reporting would occur in the same subframe, the UE shall only transmit the aperiodic CSI report in that subframe.

If the higher layer parameter altCQI-Table-r12 is configured and is set to allSubframes-r12,
the UE shall report CQI according to Table 7.2.3-2.
Else if the higher layer parameter altCQI-Table-r12 is configured and is set to csi-SubframeSet1-r12 or csi-SubframeSet2-r12,
the UE shall report CQI according to Table 7.2.3-2 for the corresponding CSI subframe set configured by altCQI-Table-r12
the UE shall report CQI for the other CSI subframe set according to Table 7.2.3-1.
Else
the UE shall report CQI according to Table 7.2.3-1.
[ . . . ]

7.2.3 Channel Quality Indicator (CQI) Definition

The CQI indices and their interpretations are given in Table 7.2.3-1 for reporting CQI based on QPSK, 16QAM and 64QAM. The CQI indices and their interpretations are given in Table 7.2.3-2 for reporting CQI based on QPSK, 16QAM, 64QAM and 256QAM. The CQI indices and their interpretations are given in Table 7.2.3-3 for reporting CQI based on QPSK and 16QAM.

For a non-BL/CE UE, based on an unrestricted observation interval in time unless specified otherwise in this subclause, and an unrestricted observation interval in frequency, the UE shall derive for each CQI value reported in uplink subframe n the highest CQI index between 1 and 15 in Table 7.2.3-1 or Table 7.2.3-2 which satisfies the following condition, or CQI index 0 if CQI index 1 does not satisfy the condition:
A single PDSCH transport block with a combination of modulation scheme and transport block size corresponding to the CQI index, and occupying a group of downlink physical resource blocks termed the CSI reference resource, could be received with a transport block error probability not exceeding 0.1.

For a BL/CE UE, based on an unrestricted observation interval in time and frequency, the UE shall derive for each CQI value the highest CQI index between 1 and 10 in Table 7.2.3-3 which satisfies the following condition, or CQI index 0 if CQI index 1 does not satisfy the condition:
A single PDSCH transport block with a combination of modulation scheme and transport block size corresponding to the CQI index, and occupying a group of downlink physical resource blocks termed the CSI reference resource, could be received with a transport block error probability not exceeding 0.1.

If CSI subframe sets $C_{CSI,0}$ and $C_{CSI,1}$ are configured by higher layers, each CSI reference resource belongs to either $C_{CSI,0}$ or $C_{CSI,1}$ but not to both. When CSI subframe sets $C_{CSI,0}$ and $C_{CSI,1}$ are configured by higher layers a UE is not expected to receive a trigger for which the CSI reference resource is in subframe that does not belong to either subframe set. For a UE in transmission mode 10 and periodic CSI reporting, the CSI subframe set for the CSI reference resource is configured by higher layers for each CSI process.

For a UE in transmission mode 9 when parameter pmi-RI-Report is configured by higher layers and parameter eMIMO-Type is not configured by higher layers, the UE shall derive the channel measurements for computing the CQI value reported in uplink subframe n based on only the Channel-State Information (CSI) reference signals (CSI-RS) defined in [3] for which the UE is configured to assume non-zero power for the CSI-RS. For a non-BL/CE UE in transmission mode 9 when the parameter pmi-RI-Report is not configured by higher layers or in transmission modes 1-8 the UE shall derive the channel measurements for computing CQI based on CRS. For a BL/CE UE the UE shall derive the channel measurements for computing CQI based on CRS. For a UE in transmission mode 10, when parameter eMIMO-Type is not configured by higher layers, the UE shall derive the channel measurements for computing the CQI value reported in uplink subframe n and corresponding to a CSI process, based on only the non-zero power CSI-RS (defined in [3]) within a configured CSI-RS resource associated with the CSI process.

For a UE in transmission mode 9 and the UE configured with parameter eMIMO-Type by higher layers, the term 'CSI process' in this clause refers to the CSI configured for the UE.

For a UE in transmission mode 9 or 10 and for a CSI process, if the UE is configured with parameter eMIMO-Type by higher layers, and eMIMO-Type is set to 'CLASS A', and one CSI-RS resource configured, or the UE is configured with parameter eMIMO-Type by higher layers, and eMIMO-Type is set to 'CLASS B', and parameter channelMeasRestriction is not configured by higher layers, the UE shall derive the channel measurements for computing the CQI value reported in uplink subframe n and corresponding to the CSI process, based on only the non-zero power CSI-RS (defined in [3]) within a configured CSI-RS resource associated with the CSI process. If the UE is configured with parameter eMIMO-Type by higher layers, and eMIMO-Type is set to 'CLASS B' and the number of configured CSI-RS resources is K>1, and parameter channelMeasRestriction is not configured by higher layers, the UE shall derive the channel measurements for computing the CQI value using only the configured CSI-RS resource indicated by the CRI.

For a UE in transmission mode 9 or 10 and for a CSI process, if the UE is configured with parameter eMIMO-Type by higher layers, and eMIMO-Type is set to 'CLASS B', and parameter channelMeasRestriction is configured by higher layers, the UE shall derive the channel measurements for computing the CQI value reported in uplink subframe n and corresponding to the CSI process, based on only the most recent, no later than the CSI reference resource, non-zero power CSI-RS (defined in [3]) within a configured CSI-RS resource associated with the CSI process. If the UE is configured with parameter eMIMO-Type by higher layers, and eMIMO-Type is set to 'CLASS B' and the number of configured CSI-RS resources is K>1, and parameter channelMeasRestriction is configured by higher layers, the UE shall derive the channel measurements for computing the CQI value using only the most recent, no later than the CSI reference resource, non-zero power CSI-RS within the configured CSI-RS resource indicated by the CRI.

For a UE in transmission mode 10, when parameter eMIMO-Type is not configured by higher layers, the UE shall derive the interference measurements for computing the CQI value reported in uplink subframe n and corresponding to a CSI process, based on only the configured CSI-IM resource associated with the CSI process.

For a UE in transmission mode 10 and for a CSI process, when parameters eMIMO-Type and interferenceMeasRestriction is configured by higher layers, the UE shall derive the interference measurements for computing the CQI value reported in uplink subframe n and corresponding to the CSI process, based on only the most recent, no later than the CSI reference resource, configured CSI-IM resource associated with the CSI process. If the UE is configured with parameter eMIMO-Type by higher layers, and eMIMO-Type is set to 'CLASS B' and the number of configured CSI-RS resources is K>1, and interferenceMeasRestriction is configured, the UE shall derive interference measurement for computing the CQI value based on only the most recent, no later than the CSI reference resource, the configured CSI-IM resource associated with the CSI-RS resource indicated by the CRI. If interferenceMeasRestriction is not configured, the UE shall derive the interference measurement for computing the CQI value based on the CSI-IM associated with the CSI-RS resource indicated by the CRI.

If the UE in transmission mode 10 is configured by higher layers for CSI subframe sets $C_{CSI,0}$ and $C_{CSI,1}$ for the CSI process, the configured CSI-IM resource within the subframe subset belonging to the CSI reference resource is used to derive the interference measurement.

For a UE configured with the parameter EIMTA-MainConfigServCell-r12 for a serving cell, configured CSI-IM resource(s) within only downlink subframe(s) of a radio frame that are indicated by UL/DL configuration of the serving cell can be used to derive the interference measurement for the serving cell.

For a LAA Scell,
for channel measurements, if the UE averages CRS/CSI-RS measurements from multiple subframes
the UE should not average CSI-RS measurement in subframe n1 with CSI-RS measurement in a later subframe n2, if any OFDM symbol of subframe n1 or any subframe from subframe n1+1 to subframe n2, is not occupied.
the UE should not average CRS measurement in subframe n1 with CRS measurement in a later subframe n2, if any OFDM symbol of the second slot of subframe n1 or any OFDM symbol of any subframe from subframe n1+1 to subframe n2-1, or any of the first 3 OFDM symbols in subframe n2, is not occupied.

for interference measurements, the UE shall derive the interference measurements for computing the CQI value based on only measurements in subframes with occupied OFDM symbols.

A combination of modulation scheme and transport block size corresponds to a CQI index if:
the combination could be signalled for transmission on the PDSCH in the CSI reference resource according to the relevant Transport Block Size table, and
the modulation scheme is indicated by the CQI index, and
the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

The CSI reference resource for a serving cell is defined as follows:
For a non-BL/CE UE, in the frequency domain, the CSI reference resource is defined by the group of downlink physical resource blocks corresponding to the band to which the derived CQI value relates. For a BL/CE UE, in the frequency domain, the CSI reference resource includes all downlink physical resource blocks for any of the narrowband to which the derived CQI value relates.
In the time domain and for a non-BL/CE UE,
for a UE configured in transmission mode 1-9 or transmission mode 10 with a single configured CSI process for the serving cell, the CSI reference resource is defined by a single downlink or special subframe $n-n_{CQI\_ref}$.
where for periodic CSI reporting $n_{CQI\_ref}$ is the smallest value greater than or equal to 4, such that it corresponds to a valid downlink or valid special subframe,
where for aperiodic CSI reporting, if the UE is not configured with the higher layer parameter csi-SubframePatternConfig-r12.
$n_{CQI\_ref}$ is such that the reference resource is in the same valid downlink or valid special subframe as the corresponding CSI request in an uplink DCI format.
$n_{CQI\_ref}$ is equal to 4 and subframe $n-n_{CQI\_ref}$ corresponds to a valid downlink or valid special subframe, where subframe $n-n_{CQI\_ref}$ is received after the subframe with the corresponding CSI request in a Random Access Response Grant.
where for aperiodic CSI reporting, and the UE configured with the higher layer parameter csi-SubframePatternConfig-r12,
for the UE configured in transmission mode 1-9, $n_{CQI\_ref}$ is the smallest value greater than or equal to 4 and subframe $n-n_{CQI\_ref}$ corresponds to a valid downlink or valid special subframe, where subframe $n-n_{CQI\_ref}$ is received on or after the subframe with the corresponding CSI request in an uplink DCI format;
$n_{CQI\_ref}$ is the smallest value greater than or equal to 4, and subframe $n-n_{CQI\_ref}$ corresponds to a valid downlink or valid special subframe, where subframe $n-n_{CQI\_ref}$ is received after the subframe with the corresponding CSI request in an Random Access Response Grant;
if there is no valid value for $n_{CQI\_ref}$ based on the above conditions, then $n_{CQI\_ref}$ is the smallest value such that the reference resource is in a valid downlink or valid special subframe $n-n_{CQI\_ref}$ prior to the subframe with the corresponding CSI request, where subframe $n-n_{CQI\_ref}$ is the lowest indexed valid downlink or valid special subframe within a radio frame;
for the UE configured in transmission mode 10,
$n_{CQI\_ref}$ is the smallest value greater than or equal to 4, such that it corresponds to a valid downlink or valid special subframe, and the corresponding CSI request is in an uplink DCI format;
$n_{CQI\_ref}$ is the smallest value greater than or equal to 4, and subframe $n-n_{CQI\_ref}$ corresponds to a valid downlink or valid special subframe, where subframe $n-n_{CQI\_ref}$ is received after the subframe with the corresponding CSI request in a Random Access Response Grant;
for a UE configured in transmission mode 10 with multiple configured CSI processes for the serving cell, the CSI reference resource for a given CSI process is defined by a single downlink or special subframe $n-n_{CQI\_ref}$.
where for FDD serving cell and periodic or aperiodic CSI reporting $n_{CQI\_ref}$ is the smallest value greater than or equal to 5, such that it corresponds to a valid downlink or valid special subframe, and for aperiodic CSI reporting the corresponding CSI request is in an uplink DCI format;
where for FDD serving cell and aperiodic CSI reporting $n_{CQI\_ref}$ is equal to 5 and subframe $n-n_{CQI\_ref}$ corresponds to a valid downlink or valid special subframe, where subframe $n-n_{CQI\_ref}$ is received after the subframe with the corresponding CSI request in a Random Access Response Grant.
where for TDD serving cell, and 2 or 3 configured CSI processes, and periodic or aperiodic CSI reporting, $n_{CQI\_ref}$ is the smallest value greater than or equal to 4, such that it corresponds to a valid downlink or valid special subframe, and for aperiodic CSI reporting the corresponding CSI request is in an uplink DCI format;
where for TDD serving cell, and 2 or 3 configured CSI processes, and aperiodic CSI reporting, $n_{CQI\_ref}$ is equal to 4 and subframe $n-n_{CQI\_ref}$ corresponds to a valid downlink or valid special subframe, where subframe $n-n_{CQI\_ref}$ is received after the subframe with the corresponding CSI request in a Random Access Response Grant;
where for TDD serving cell, and 4 configured CSI processes, and periodic or aperiodic CSI reporting, $n_{CQI\_ref}$ is the smallest value greater than or equal to 5, such that it corresponds to a valid downlink or valid special subframe, and for aperiodic CSI reporting the corresponding CSI request is in an uplink DCI format;
where for TDD serving cell, and 4 configured CSI processes, and aperiodic CSI reporting, $n_{CQI\_ref}$ is equal to 5 and subframe $n-n_{CQI\_ref}$ corresponds to a valid downlink or valid special subframe, where subframe $n-n_{CQI\_ref}$ is received after the subframe with the corresponding CSI request in a Random Access Response Grant.

In the time domain and for a BL/CE UE, the CSI reference resource is defined by a set of BL/CE downlink or special subframes where the last subframe is subframe $n-n_{CQI\_ref}$,
where for periodic CSI reporting $n_{CQI\_ref}$ is $\geq 4$;
where for aperiodic CSI reporting $n_{CQI\_ref}$ is $\geq 4$;
where each subframe in the CSI reference resource is a valid downlink or valid special subframe;
where for wideband CSI reports:
The set of BL/CE downlink or special subframes is the set of the last $\text{ceil}(R^{CSI}/N_{NB,hop}^{ch,DL})$ subframes before $n-n_{CQI\_ref}$ used for MPDCCH monitoring by the BL/CE UE in each of the narrowbands where the BL/CE UE monitors MPDCCH, where $N_{NB,hop}^{ch,DL}$ is the number of narrowbands where the BL/CE UE monitors MPDCCH.
where for subband CSI reports:
The set of BL/CE downlink or special subframes is the set of the last $R^{CSI}$ subframes used for MPDCCH monitoring by the BL/CE UE in the corresponding narrowband before $n-n_{CQI\_ref}$;
where $R^{CSI}$ is given by the higher layer parameter csi-NumRepetitionCE.
A subframe in a serving cell shall be considered to be a valid downlink or a valid special subframe if:
it is configured as a downlink subframe or a special subframe for that UE, and
in case multiple cells with different uplink-downlink configurations are aggregated and the UE is not capable of simultaneous reception and transmission in the aggregated cells, the subframe in the primary cell is a downlink subframe or a special subframe with the length of DwPTS more than $7680 \cdot T_s$, and
except for a non-BL/CE UE in transmission mode 9 or 10, it is not an MBSFN subframe, and
it does not contain a DwPTS field in case the length of DwPTS is $7680 \cdot T_s$ and less, and
it does not fall within a configured measurement gap for that UE, and
for periodic CSI reporting, it is an element of the CSI subframe set linked to the periodic CSI report when that UE is configured with CSI subframe sets, and
for a UE configured in transmission mode 10 with multiple configured CSI processes, and aperiodic CSI reporting for a CSI process, it is an element of the CSI subframe set linked to the downlink or special subframe with the corresponding CSI request in an uplink DCI format, when that UE is configured with CSI subframe sets for the CSI process and UE is not configured with the higher layer parameter csi-SubframePatternConfig-r12, and
for a UE configured in transmission mode 1-9, and aperiodic CSI reporting, it is an element of the CSI subframe set associated with the corresponding CSI request in an uplink DCI format, when that UE is configured with CSI subframe sets by the higher layer parameter csi-SubframePatternConfig-r12, and
for a UE configured in transmission mode 10, and aperiodic CSI reporting for a CSI process, it is an element of the CSI subframe set associated with the corresponding CSI request in an uplink DCI format, when that UE is configured with CSI subframe sets by the higher layer parameter csi-SubframePattern-Config-r12 for the CSI process.

except if the serving cell is a LAA Scell, and at least one OFDM symbol in the subframe is not occupied.

except if the serving cell is a LAA Scell, and n'$_s$≠n$_s$ as described in sub clause 6.10.1.1 in [3].

except if the serving cell is a LAA Scell, and for a UE configured in transmission mode 9 or 10, the configured CSI-RS resource associated with the CSI process is not in the subframe.

For a non-BL/CE UE, if there is no valid downlink or no valid special subframe for the CSI reference resource in a serving cell, CSI reporting is omitted for the serving cell in uplink subframe n.

In the layer domain, the CSI reference resource is defined by any RI and PMI on which the CQI is conditioned.

In the CSI reference resource, the UE shall assume the following for the purpose of deriving the CQI index, and if also configured, PMI and RI:

The first 3 OFDM symbols are occupied by control signalling

No resource elements used by primary or secondary synchronization signals or PBCH or EPDCCH CP length of the non-MBSFN subframes Redundancy Version 0

If CSI-RS is used for channel measurements, the ratio of PDSCH EPRE to CSI-RS EPRE is as given in sub-clause 7.2.5

For transmission mode 9 CSI reporting of a non-BL/CE UE:

CRS REs are as in non-MBSFN subframes;

If the UE is configured for PMI/RI reporting or without PMI reporting, the UE-specific reference signal overhead is consistent with the most recent reported rank if more than one CSI-RS port is configured, and is consistent with rank 1 transmission if only one CSI-RS port is configured; and PDSCH signals on antenna ports {7 . . . 6+υ} for υ layers would result in signals equivalent to corresponding symbols transmitted on antenna ports {15 . . . 14+P}, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where x(i)=[x$^{(0)}$(i) . . . x$^{(υ−1)}$(i)]$^T$ is a vector of symbols from the layer mapping in subclause 6.3.3.2 of [3], P∈{1,2,4,8,12,16} is the number of CSI-RS ports configured, and if only one CSI-RS port is configured, W(i) is 1, otherwise for UE configured for PMI/RI reporting W(i) is the precoding matrix corresponding to the reported PMI applicable to x(i) and for UE configured without PMI reporting W(i) is the selected precoding matrix corresponding to the reported CQI applicable to x(i). The corresponding PDSCH signals transmitted on antenna ports {15 . . . 14+P} would have a ratio of EPRE to CSI-RS EPRE equal to the ratio given in subclause 7.2.5.

For transmission mode 10 CSI reporting, if a CSI process is configured without PMI/RI reporting:

If the number of antenna ports of the associated CSI-RS resource is one, a PDSCH transmission is on single-antenna port, port 7. The channel on antenna port {7} is inferred from the channel on antenna port {15} of the associated CSI-RS resource.

CRS REs are as in non-MBSFN subframes. The CRS overhead is assumed to be the same as the CRS overhead corresponding to the number of CRS antenna ports of the serving cell;

The UE-specific reference signal overhead is 12 REs per PRB pair.

Otherwise,

If the number of antenna ports of the associated CSI-RS resource is 2, the PDSCH transmission scheme assumes the transmit diversity scheme defined in subclause 7.1.2 on antenna ports {0,1} except that the channels on antenna ports {0,1} are inferred from the channels on antenna port {15, 16} of the associated CSI resource respectively.

If the number of antenna ports of the associated CSI-RS resource is 4, the PDSCH transmission scheme assumes the transmit diversity scheme defined in subclause 7.1.2 on antenna ports {0,1, 2,3} except that the channels on antenna ports {0,1,2,3} are inferred from the channels on antenna ports {15, 16, 17, 18} of the associated CSI-RS resource respectively.

The UE is not expected to be configured with more than 4 antenna ports for the CSI-RS resource associated with the CSI process configured without PMI/RI reporting.

The overhead of CRS REs is assuming the same number of antenna ports as that of the associated CSI-RS resource.

UE-specific reference signal overhead is zero.

For transmission mode 10 CSI reporting, if a CSI process is configured with PMI/RI reporting or without PMI reporting:

CRS REs are as in non-MBSFN subframes. The CRS overhead is assumed to be the same as the CRS overhead corresponding to the number of CRS antenna ports of the serving cell;

The UE-specific reference signal overhead is consistent with the most recent reported rank for the CSI process if more than one CSI-RS port is configured, and is consistent with rank 1 transmission if only one CSI-RS port is configured; and PDSCH signals on antenna ports {7 . . . 6+υ} for υ layers would result in signals equivalent to corresponding symbols transmitted on antenna ports {15 . . . 14+P}, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where x(i)=[x$^{(0)}$(i) . . . x$^{(υ−1)}$(i)]$^T$ is a vector of symbols from the layer mapping in subclause 6.3.3.2 of [3], P∈{1,2,4,8,12,16} is the number of antenna ports of the associated CSI-RS resource, and if P=1, W(i) is 1, otherwise for UE configured for PMI/RI reporting W(i) is the precoding matrix corresponding to the reported PMI applicable to x(i) and for UE configured without PMI reporting W(i) is the selected precoding matrix corresponding to the reported CQI applicable to x(i). The corresponding PDSCH signals transmitted on antenna ports {15 . . . 14+P} would have a ratio of EPRE to CSI-RS EPRE equal to the ratio given in subclause 7.2.5

Assume no REs allocated for CSI-RS and zero-power CSI-RS

Assume no REs allocated for PRS

The PDSCH transmission scheme given by Table 7.2.3-0 depending on the transmission mode currently configured for the UE (which may be the default mode).

If CRS is used for channel measurements, the ratio of PDSCH EPRE to cell-specific RS EPRE is as given in subclause 5.2 with the exception of $\rho_A$ which shall be assumed to be $\rho_A = P_A + \Delta_{offset} + 10 \log_{10}(2)$ [dB] for any modulation scheme, if the UE is configured with transmission mode 2 with 4 cell-specific antenna ports, or transmission mode 3 with 4 cell-specific antenna ports and the associated RI is equal to one;

$\rho_A = P_A + \Delta_{offset}$ [dB] for any modulation scheme and any number of layers, otherwise.

The shift $\Delta_{offset}$ is given by the parameter nomPDSCH-RS-EPRE-Offset which is configured by higher-layer signalling.

Table 7.2.3-0 of 3GPP TS 36.213 v13.2.0, Entitled "PDSCH Transmission Scheme Assumed for CSI Reference Resource", is Reproduced as FIG. 10

Table 7.2.3-1 of 3GPP TS 36.213 v13.2.0, Entitled "4-Bit CQI Table", is Reproduced as FIG. 11

Table 7.2.3-2 of 3GPP TS 36.213 v13.2.0, Entitled "4-Bit CQI Table 2", is Reproduced as FIG. 12

Table 7.2.3-3 of 3GPP TS 36.213 v13.2.0, Entitled "4-Bit CQI Table 3", is Reproduced as FIG. 13

In general, physical layer procedures for beamforming require multi-beam based approaches. The eNB performs beamforming to overcome the higher pathloss in higher frequency. At one time or one symbol time, the eNB generates part of eNB beams instead of all eNB beams due to the limitation of analog or hybrid beamforming. For transmission scheduling, the eNB requires the beam information of a UE, for instance which eNB beams are qualified for the UE. The eNB beam with qualified channel quality may mean the beam(s) with RSRP (Reference Signal Received Power) or SINR larger than some threshold or the beam(s) with pathloss (PL) smaller than some threshold. Alternatively, the eNB beam with qualified channel quality may mean the beam(s) with RSRP or SINR or PL (absolute) difference smaller than some threshold comparing to the eNB beam with the best channel quality.

The eNB may perform beam sweeping on SRS to get the qualified eNB beam information of a UE. Alternatively, a UE can perform eNB beam measurement, and then report the qualified eNB beam information to eNB. Similarly, the UE may possibly have the capability to perform beamforming, i.e., to form UE beam(s), to get more power gain.

Multi-beam based approaches require consideration on how to determine UL RS (Reference Signal) power. The UL RS may comprise UL RS for demodulation, UL RS for channel measurement, and UL RS for beam management. The UL RS for demodulation may be UL DMRS. The UL RS for channel measurement may be Sounding RS. The UL RS for beam management may be sounding RS or a new UL RS.

Considering different functional characteristics and requirements, different power control mechanisms may be applied.

Since UL RS for demodulation is for demodulation of uplink data and/or control channel, the transmit power of UL RS for demodulation shall be determined as transmit power of the associated uplink data and/or control channel.

As for UL RS for UL channel measurement, the motivation is to assist TRP or eNB in measuring UL channel. In LTE or LTE-A, SRS is utilized for UL channel measurement. And SRS power is associated with PUSCH, e.g., sharing some configured power parameters and sharing the close-loop power control adjustment state. For the multi-beam based approaches, one possible direction is to associate UL data channel for determining the transmit power of UL RS for channel measurement.

The UL RS for channel measurement may be sounding reference signal. The transmit power of UL RS for channel measurement on different UE beams may be different. Moreover, a TPC (Transmit Power Control) (command) can be applied for power control of UL RS for beam management, uplink data and/or control channel, and/or UL RS for UL channel measurement. The TPC (command) may be delivered via a DL (Downlink) control signaling.

In case that the power control of uplink data channel is performed per UE beam, pathloss derivation and/or TPC command are applied per UE beam. The transmit power of UL RS for channel measurement of a UE beam can be associated with the uplink data channel of the same UE beam. More specifically, the transmit power of UL RS for channel measurement can be determined via sharing any of some configured power parameters, pathloss derivation or close-loop power control adjustment state of the uplink data channel on the same UE beam. Since the linked eNB beam(s) or TRP beam(s) and propagation path for each UE beam would be different, it would be more accurate and adaptive to perform per UE beam power control for UL RS for UL channel measurement.

In case that the power control of uplink data channel is not performed per UE beam, for instance, the power control of uplink data channel is performed per UE, and pathloss derivation and TPC command (enhanced) are applied to all beams. The UE can associate the transmit power of UL RS for channel measurement of a UE beam to the uplink data channel, irrespective of which UE beam is used for uplink data channel. More specifically, the transmit power of UL RS for channel measurement of a UE beam is associated with the transmit power of the latest uplink data channel transmission, irrespective of which UE beam is used for uplink data channel transmission. If there is an uplink data channel transmission in the same subframe, slot, or mini-slot with a UL RS transmission for channel measurement, the transmit power of the UL RS for channel measurement may be associated with the uplink data channel transmission. Alternatively, the UE can associate the transmit power of UL RS for channel measurement of a UE beam to the uplink data channel on the same UE beam. More specifically, the transmit power of UL RS for channel measurement of a UE beam is associated with the transmit power of the latest uplink data channel transmission on the same UE beam. If there is an uplink data channel transmission on the same UE beam in the same subframe, slot, or mini-slot with a UL RS transmission for channel measurement, the transmit power of the UL RS for channel measurement may be associated with the uplink data channel transmission. The association means that the transmit power determination of UL RS for channel measurement shares any of some configured power parameters, pathloss derivation, or the close-loop power control adjustment state of the associated uplink data channel.

More specifically, the UL RS for channel measurement may be configured or transmitted on the UE beam(s) linked with qualified eNB beam(s) or TRP beam(s). It may be possible to skip UL RS transmission for channel measurement on a UE beam if there is no detected eNB beams or TRP beams, or if there is no linked qualified eNB beam(s) or TRP beam(s) on the UE beam. More specifically, no detected eNB beams or TRP beams or no linked qualified eNB beam(s) or TRP beam(s) may mean that the associated DL RS is not detected or that the channel quality of the associated DL RS is worse (for instance, RSRP is lower than a threshold). Alternatively, the UL RS for channel measurement is transmitted on a UE beam if there is no detected eNB beams or TRP beams or there is no linked qualified eNB beam(s) or TRP beam(s) on the UE beam.

As for UL RS for beam measurement, the motivation is to assist TRP or eNB in detecting and/or tracking qualified eNB beam(s) and/or qualified UE beam(s) for the UE. It may be assumed that all UE beams shares the same transmit power of UL RS for beam measurement. The power control of UL RS for beam management is performed separately from the power control of UL RS for UL channel measurement. More specifically, the power control of UL RS for beam management may not be associated with uplink data and/or control channel. Moreover, it is possible to design a TPC (command) specifically for power control of UL RS for beam management, instead of for uplink data and/or control channel and UL RS for UL channel measurement. The TPC (command) may be applied per UE beam. Moreover, the TPC (command) may be applied per UE beam group. The TPC (command) may be delivered via DL control signaling.

Furthermore, if there is no detected eNB beams or TRP beams, or if there is no linked qualified eNB beam(s) or TRP beam(s) on a UE beam, it is possible that the UE skips some or all transmit occasions of UL RS transmission for beam management on the UE beam. Alternatively, the UE may transmit (periodic) UL RS for beam management, except on the UE beam(s) with (periodic) UL RS for UL channel measurement. It may mean that if there is any detected eNB beams or TRP beams or if there is linked qualified eNB beam(s) or TRP beam(s) on a UE beam, the UE skips some or all transmit occasions of the (periodic) UL RS transmission for beam management on the UE beam. Since the (periodic) UL RS transmission for UL channel measurement can assist eNB or TRP in performing beam management. More specifically, no detected eNB beams or TRP beams or no linked qualified eNB beam(s) or TRP beam(s) may mean that the associated DL RS is not detected or that the channel quality of the associated DL RS is worse, for instance RSRP lower than a threshold. Alternatively, the UL RS for beam management is transmitted on a UE beam if there is no detected eNB beams or TRP beams or there is no linked qualified eNB beam(s) or TRP beam(s) on the UE beam.

Figure 14:
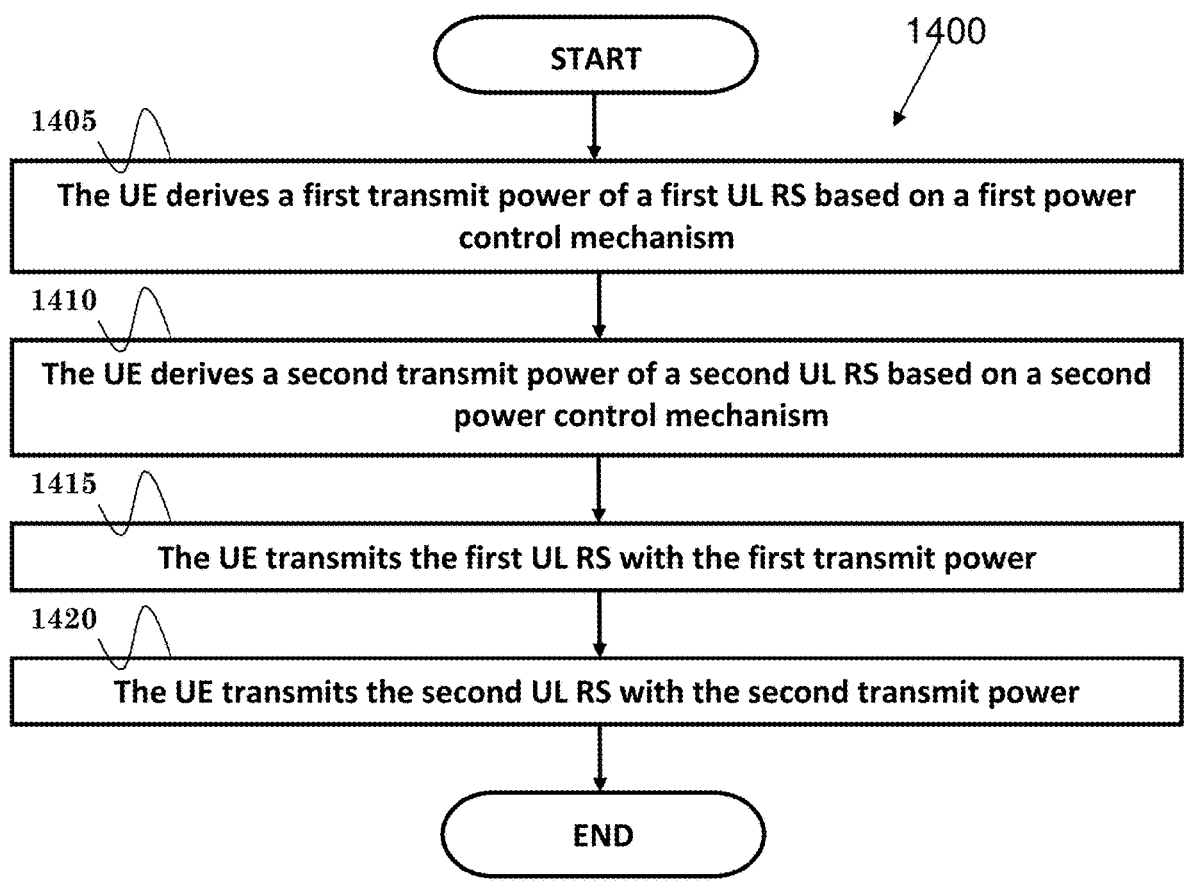
FIG. 14 is a flow chart according to one exemplary embodiment from the perspective of a UE.

FIG. 14 is a flow chart 1400 according to one exemplary embodiment from the perspective of a UE. In step 1405, the UE derives a first transmit power of a first UL RS based on a first power control mechanism. In step 1410, the UE derives a second transmit power of a second UL RS based on a second power control mechanism. In step 1415, the UE transmits the first UL RS with the first transmit power. In step 1420, the UE transmits the second UL RS with the second transmit power.

Figure 15:
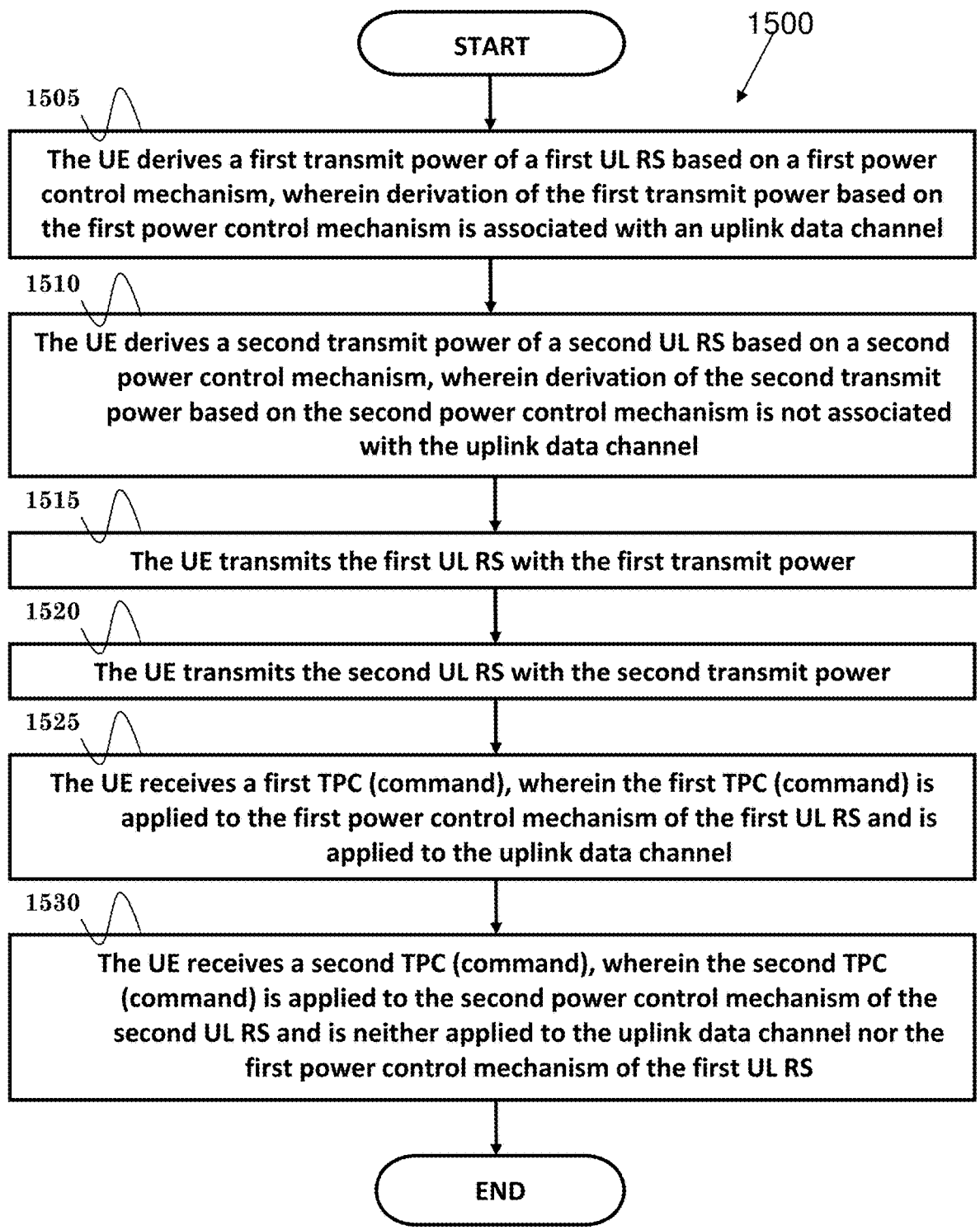
FIG. 15 is a flow chart according to one exemplary embodiment from the perspective of a UE.

FIG. 15 is a flow chart 1500 according to one exemplary embodiment from the perspective of a UE. In step 1505, the UE derives a first transmit power of a first UL RS based on a first power control mechanism, wherein derivation of the first transmit power based on the first power control mechanism is associated with an uplink data channel. In step 1510, the UE derives a second transmit power of a second UL RS based on a second power control mechanism, wherein derivation of the second transmit power based on the second power control mechanism is not associated with the uplink data channel. In step 1515, the UE transmits the first UL RS with the first transmit power. In step 1520, the UE transmits the second UL RS with the second transmit power.

In one embodiment, as shown in step 1525, the UE receives a first TPC (command), wherein the first TPC (command) is applied to the first power control mechanism of the first UL RS and is applied to the uplink data channel. Furthermore, in step 1530, the UE receives a second TPC (command), wherein the second TPC (command) is applied to the second power control mechanism of the second UL RS and is neither applied to the uplink data channel nor the first power control mechanism of the first UL RS.

In one embodiment, the first UL RS and the second UL RS could be used for different functions with different characteristics. For example, the first UL RS could be used for channel measurement. For example, the second UL RS could be used for beam management. The first UL RS and the second UL RS could be different kinds or types of reference signaling. For example, the first UL RS could be a sounding reference signaling. For example, the second UL RS could be a sounding reference signal. The sounding reference signal of the second UL RS could be a different kind or type from the first UL RS. Alternatively, the second UL RS could be neither a DMRS (DeModulation Reference Signal) nor a sounding reference signal.

In one embodiment, for the first power control mechanism, the derivation of the first transmit power of the first UL RS could be associated with uplink data channel. For the first power control mechanism, the first transmit power derivation of the first UL RS could share any of some configured power parameters, pathloss derivation, or the close-loop power control adjustment state of the associated uplink data channel. Derivation of the first transmit power based on the first power control mechanism uses at least one of configured power parameters, pathloss derivation, and close-loop power control adjustment state of the associated uplink data channel.

For the first power control mechanism, if power control of the uplink data channel is performed per UE beam, the first transmit power of the first UL RS of a UE beam could be associated with the uplink data channel of the same UE beam. Alternatively, for the first power control mechanism, if power control of the uplink data channel is performed per UE, the first transmit power of the first UL RS of a UE beam could be associated with the uplink data channel regardless of which UE beam is used for the uplink data channel. Alternatively or additionally, the first transmit power of the first UL RS of a UE beam could be associated with the latest uplink data channel transmission regardless of which UE beam is used for the uplink data channel transmission.

In one embodiment, for the first power control mechanism, if there is an uplink data channel transmission in the same subframe, slot, or mini-slot with the first UL RS transmission, the first transmit power of the first UL RS could be associated with the uplink data channel transmission. For the first power control mechanism, if power control of the uplink data channel is performed per UE, the first transmit power of the first UL RS of a UE beam could be associated with the uplink data channel (or the latest of uplink data channel) on the same UE beam.

In one embodiment, for the first power control mechanism, if there is an uplink data channel transmission on the same UE beam in the same subframe, slot, or mini-slot with the first UL RS transmission, the first transmit power of the first UL RS could be associated with the uplink data channel transmission.

In one embodiment, the UE receives a first TPC (Transmit Power Control) (command). The first TPC (command) could be delivered via DL (Downlink) control signaling. The first TPC (command) could be applied to the first power control mechanism of the first UL RS. Alternatively or additionally, the first TPC (command) could be applied to the power control of the uplink data channel. Alternatively or additionally, the first TPC (command) could be applied to the uplink control channel.

In one embodiment, the UE could skip the first UL RS transmission on a UE beam if there is no detected eNB beams or TRP beams or there is no linked qualified eNB beam(s) or TRP beam(s) on the UE beam. For the first power control mechanism, the first transmit power of the first UL RS on different UE beams can be different.

In one embodiment, the derivation of the second transmit power of the second UL RS could be performed separately from the derivation of the first transmit power of the first UL RS. For the second power control mechanism, the derivation of the second transmit power of the second UL RS may not be associated with an uplink data and/or control channel. For the second power control mechanism, the second transmit power of the second UL RS on different UE beams could be the same.

In one embodiment, the UE receives a second TPC (command). The second TPC (command) could be delivered via DL control signaling. The second TPC (command) could be applied per UE beam or per UE beam group. Alternatively or additionally, the second TPC (command) could be applied (specifically) to the second power control mechanism of the second UL RS. However, the second TPC (command) may not be applied to an uplink data and/or control channel, and/or to the first power control mechanism of the first UL RS.

In one embodiment, if there is no detected eNB beam or TRP beam or there is no linked qualified eNB beam(s) or TRP beam(s) on a UE beam, the UE could skip some or all transmit occasions of the second UL RS on the UE beam. Alternatively, if there is any detected eNB beam or TRP beams or there is any linked qualified eNB beam(s) or TRP beam(s) on a UE beam, the UE could skip some or all transmit occasions of the second UL RS on the UE beam. No detected eNB beams or TRP beams on a UE beam could mean that the DL RS is not detected on the UE beam or that measured channel quality of the DL RS is worse. No linked qualified eNB beam(s) or TRP beam(s) on a UE beam could mean that an associated DL RS is not detected on the UE beam or measured channel quality of the DL RS is worse. Worse channel quality of the DL RS could mean that measured RSRP of the DL RS is lower than a threshold. The DL RS could be a beam reference signal.

An eNB beam or TRP beam with qualified channel quality could mean that the UE receives the eNB beam or TRP beam with RSRP or SINR larger than some threshold or with a pathloss smaller than some threshold.

In one embodiment, the UE could transmit the (periodic) second UL RS, except on UE beam(s) with the (periodic) first UL RS.

Referring back to FIGS. 3 and 4, in one exemplary embodiment of a UE illustrated in FIG. 14 and discussed above, the device 300 includes a program code 312 stored in the memory 310. The CPU 308 could execute program code 312 to enable the UE (i) to derive a first transmit power of a first UL RS based on a first power control mechanism, (ii) to derive a second transmit power of a second UL RS based on a second power control mechanism, (iii) to transmit the first UL RS with the first transmit power, and (iv) to transmit the second UL RS with the second transmit power. Furthermore, the CPU 308 can execute the program code 312 to perform all of the above-described actions and steps or others described herein.

Referring back to FIGS. 3 and 4, in one exemplary embodiment of a UE illustrated in FIG. 15 and discussed above, the device 300 includes a program code 312 stored in the memory 310. The CPU 308 could execute program code 312 to enable the UE (i) to derive a first transmit power of a first UL RS based on a first power control mechanism, wherein derivation of the first transmit power based on the first power control mechanism is associated with an uplink data channel, (ii) to derive a second transmit power of a second UL RS based on a second power control mechanism, wherein derivation of the second transmit power based on the second power control mechanism is not associated with the uplink data channel, (iii) to transmit the first UL RS with the first transmit power, and (iv) to transmit the second UL RS with the second transmit power.

In one embodiment, the CPU 308 could further execute program code 312 to enable the UE (i) to receive a first TPC (command), wherein the first TPC (command) is applied to the first power control mechanism of the first UL RS and is applied to the uplink data channel, and (ii) to receive a second TPC (command), wherein the second TPC (command) is applied to the second power control mechanism of the second UL RS and is neither applied to the uplink data channel nor the first power control mechanism of the first UL RS.

Furthermore, the CPU 308 can execute the program code 312 to perform all of the above-described actions and steps or others described herein.

During random access (for initial access), initial transmit power of some beam(s) used for random access may be decided. As shown in exemplary FIGS. 16 and 17, UE beam B2 with transmit power P1 is found during a RA (Random Access) procedure. It means that TRP can detect UL transmission on UE beam B2 with received power exceeding a reception threshold, $P_{RX}$. Furthermore, for the same TRP, UE beam B3 is considered as candidate beam to be qualified UE beam, but UE beam B1 and B4. Then, not all candidate UE beams can be found with transmit power P1 since the received power at TRP is lower than the reception threshold, $P_{RX}$.

Figure 16:
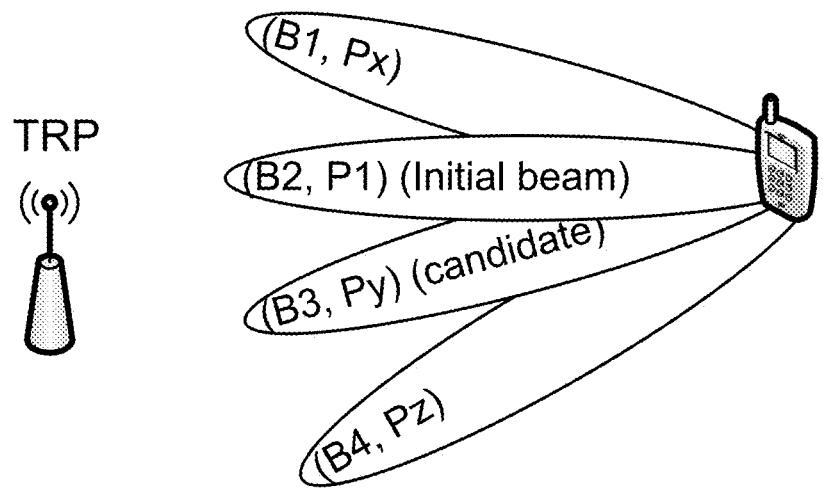
FIG. 16 is a diagram according to one exemplary embodiment.
Figure 17:
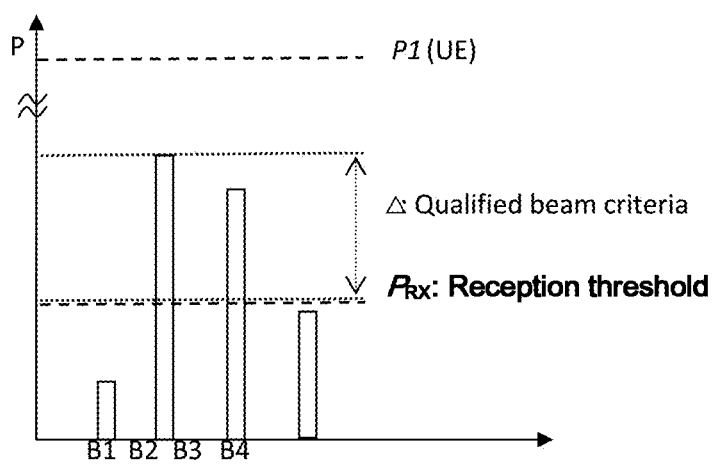
FIG. 17 is a diagram according to one exemplary embodiment.

Thus, to assist TRP in detecting all candidate UE beams, the following approach(es) could be considered and used:

First Approach—In general, the first approach is to use a specific power value for the transmit power of UL RS for beam management on each UE beam(s), e.g., UE beams B1~B4 in the instance of FIG. 16 and FIG. 17. The specific power value may be configured or specified. Moreover, pathloss may not be considered for the transmit power derivation. More specifically, the transmit power of UL RS for beam management is set as the specific power value. Alternatively, pathloss may be considered for the transmit power derivation, and the pathloss may be derived from DL RS measurement result of eNB beams or TRP beams. More specifically, the transmit power of UL RS for beam management is set as the specific power value+pathloss. The DL RS may be BRS (Beam Reference Signal).

Moreover, if there is no detected eNB beams or TRP beams or if there is no linked qualified eNB beam(s) or TRP beam(s) on a UE beam, it is possible that the UE skips some or all transmit occasions of UL RS for beam management on the UE beam.

Second Approach—In general, the second approach is that transmit power derivation of UL RS for beam management comprises required UL transmit power of UE beam(s) for eNB or TRP detection. The required UL transmit power of a UE beam for eNB or TRP detection means that the eNB or TRP can receive the UL RS with received power exceeding a reception threshold. Furthermore, the transmit power derivation of UL RS for beam management comprises an offset. More specifically, the offset is a qualified beam criterion. A eNB beam or a TRP beam with qualified channel quality means the eNB beam or the TRP beam with RSRP, SINR, or PL (absolute) difference smaller than the qualified beam criterion comparing to the eNB beam or the TRP beam with the best channel quality. For instance, UE beam B2 with transmit power P1 is derived during RA procedure. Then, the transmit power of UL RS for beam management on UE beam B2 is P1+offset. The transmit power of UL RS for beam management on UE beam B3, B1 and B4 are P1+offset as well. It means that the (initial) transmit power of the UL RS for beam management is derived at least from the offset and the required UL transmit power of a UE beam(s) derived from random access procedure.

The transmit power derivation of the UL RS for beam management may comprise the required UL transmit power of UE beam(s) for eNB or TRP detection with received power exceeding a reception threshold. Denoted P1, Px, Py, Pz are the required UL transmit power on UE beam B2, B1, B3, B4 for eNB or TRP detection with received power exceeding a reception threshold, $P_{RX}$. With UE moving or rotation, the values of P1, Px, Py, Pz may change since propagation loss changes. Then, the transmit power derivation of UL RS for beam management may comprise min(P1, Px, Py, Pz). More specifically, the transmit power derivation of UL RS for beam management may be derived from min(P1, Px, Py, Pz)+offset. Alternatively, if the UE beam 2 is associated with the eNB beam or TRP beam with the best channel quality, the transmit power derivation of UL RS for beam management may comprise P1. More specifically, the transmit power derivation of UL RS for beam management may be derived from P1+offset.

More specifically, the required UL transmit power of a UE beam for eNB or TRP detection with received power exceeding a reception threshold may be derived from measuring DL RS of the eNB beam(s) or TRP beam(s). Thus, the P1, Px, Py, Pz may be derived from measuring DL RS of the eNB beam(s) or TRP beam(s). The DL RS may be BRS.

If there is no detected eNB beams or TRP beams or there is no linked qualified eNB beam(s) or TRP beam(s) on the UE Beam(s), it can be determined as Pcmax or no value. No value means that a value is not included in the transmit power determination of UL RS for beam management. For instance, the transmit power derivation of UL RS for beam management may comprise min(P1, Py) wherein the UE beam B2 and B3 are linked with qualified eNB beam(s) or TRP beam(s) and the UE beam B1 and B4 are not linked with any qualified eNB beam(s) or TRP beam(s).

Px and Pz are not included in the transmit power determination of UL RS for beam management, since there is no detected eNB beams or TRP beams or there is no linked qualified eNB beam(s) or TRP beam(s) on UE beam B1 and UE beam B4. More specifically, the transmit power derivation of UL RS for beam management may be derived from min(P1, Py)+offset. Alternatively, if Pcmax is determined for the UE beam(s) wherein there is no detected eNB beams or TRP beams, or if there is no linked qualified eNB beam(s) or TRP beam(s) on the UE Beam(s), the transmit power derivation of UL RS for beam management may comprise min(P1, Px, Py, Pz). More specifically, the transmit power derivation of UL RS for beam management may be derived from min(P1, Px, Py, Pz)+offset.

Furthermore, a specific value can be configured or specified as minimum required UE beam power for beam management. More specifically, the transmit power derivation of UL RS for beam management may be derived from Max (specific value, min(P1, Px, Py, Pz)+offset). If there is no detected eNB beams or TRP beams or if there is no linked qualified eNB beam(s) or TRP beam(s) on the UE beam B1 and UE beam B4, the transmit power derivation of UL RS for beam management may be derived from Max(specific power value, min(P1, Py)+offset) or Max(specific value, min(P1, Px, Py, Pz)+offset).

Moreover, if there is no detected eNB beams or TRP beams or if there is no linked qualified eNB beam(s) or TRP beam(s) on a UE beam, it is possible that the UE skips some or all transmit occasions of UL RS transmission for beam management on the UE beam.

Third Approach—In general, the third approach is that the UE transmits (periodic) UL RS for beam management, except on the UE beam(s) with (periodic) UL RS for UL channel measurement. It may mean that if there is any detected eNB beams or TRP beams or there is linked qualified eNB beam(s) or TRP beam(s) on a UE beam, the UE skips some or all transmit occasions of the (periodic) UL RS transmission for beam management on the UE beam. Since the (periodic) UL RS transmission for UL channel measurement can assist eNB or TRP in performing beam management. Thus, in this approach, the transmit power of UL RS for beam management is determined or derived from a specific power value. The specific power value may be configured or specified. Moreover, pathloss may not be considered for the transmit power derivation. Alternatively, pathloss may be considered for the transmit power derivation and the pathloss may be derived from DL RS measurement result of eNB beams or TRP beams. The DL RS may be BRS.

More specifically, no detected eNB beams or TRP beams or no linked qualified eNB beam(s) or TRP beam(s) may mean that the associated DL RS is not be detected or the channel quality of the associated DL RS is worse, for instance RSRP lower than a threshold.

Figure 18:
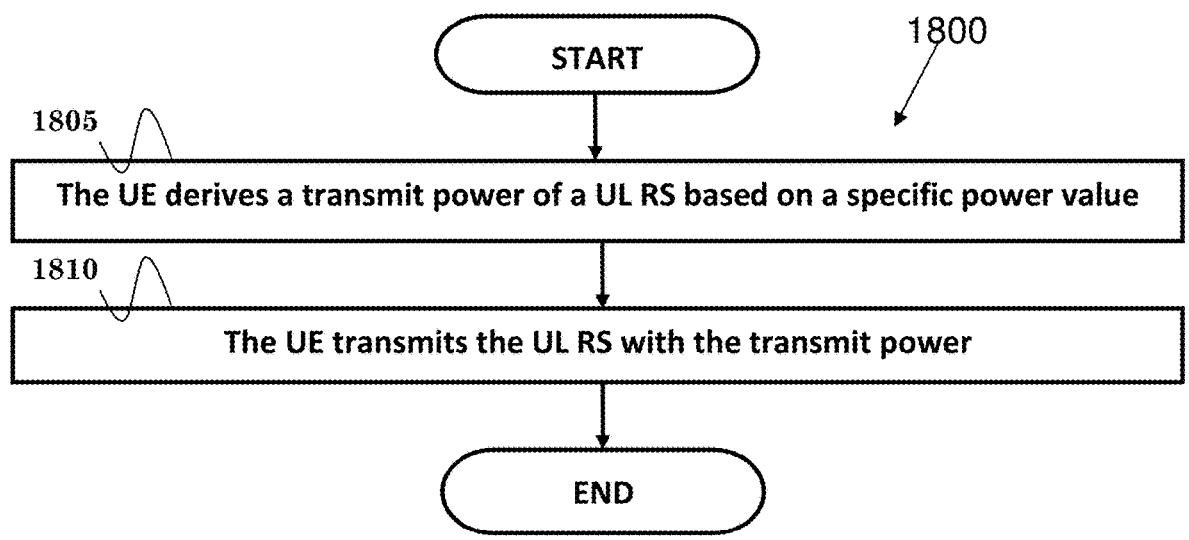
FIG. 18 is a flow chart according to one exemplary embodiment from the perspective of a UE.

FIG. 18 is a flow chart 1800 according to one exemplary embodiment from the perspective of a UE. In step 1805, the UE derives a transmit power of a UL RS based on a specific power value. In step 1810, the UE transmits the UL RS with the transmit power.

Figure 19:
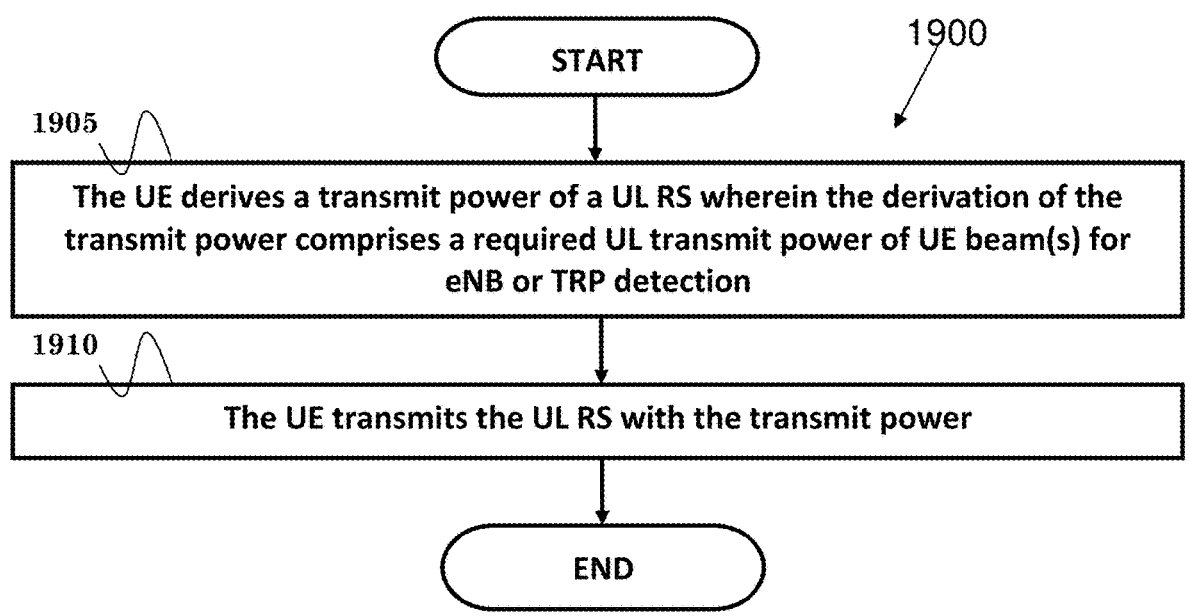
FIG. 19 is a flow chart according to one exemplary embodiment from the perspective of a UE.

FIG. 19 is a flow chart 1900 according to one exemplary embodiment from the perspective of a UE. In step 1905, the UE derives a transmit power of a UL RS wherein a derivation of the transmit power comprises a required UL transmit power of UE beam(s) for eNB or TRP detection. In step 1910, the UE transmits the UL RS with the transmit power.

Figure 20:
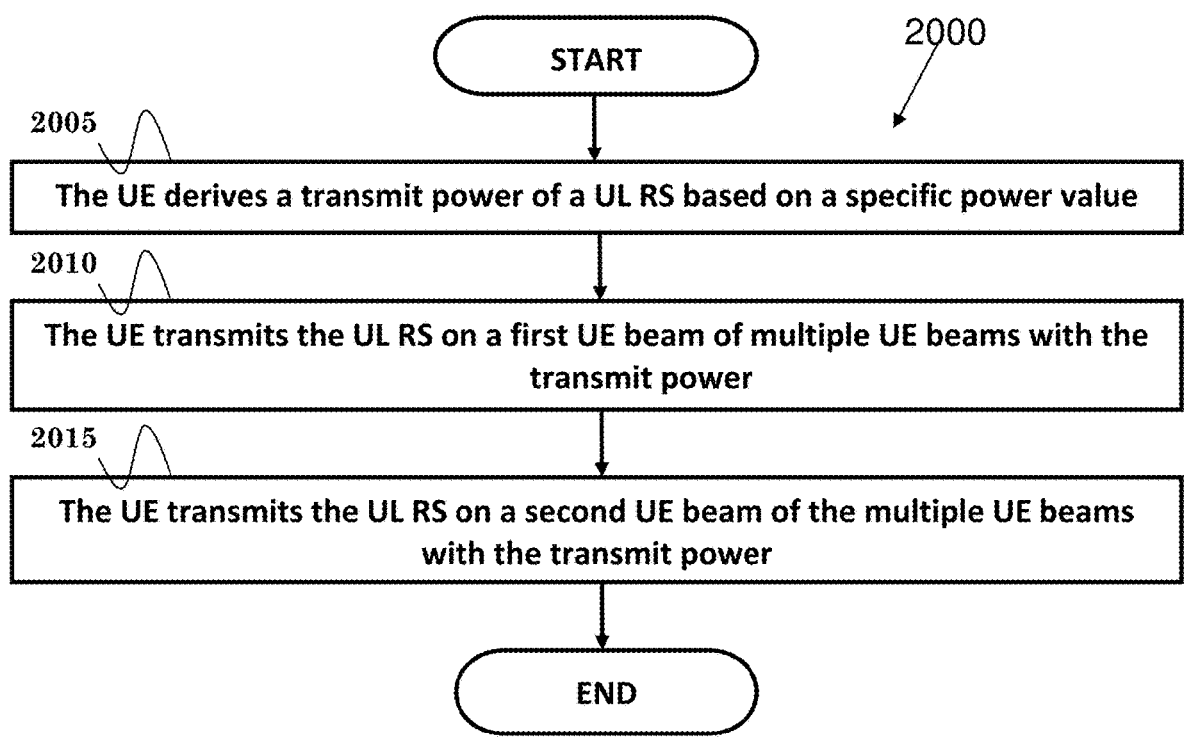
FIG. 20 is a flow chart according to one exemplary embodiment from the perspective of a UE.

FIG. 20 is a flow chart 2000 according to one exemplary embodiment from the perspective of a UE. In step 2005, the UE derives a transmit power of a UL RS based on a specific power value. In step 2010, the UE transmits the UL RS on a first UE beam of multiple UE beams with the transmit power. In step 2015, the UE transmits the UL RS on a second UE beam of the multiple UE beams with the transmit power.

In one embodiment, the UL RS could be for beam management. The UL RS could be a sounding reference signaling. Alternative, the UL RS is neither a DMRS nor a sounding reference signal.

In one embodiment, the derivation of the transmit power of the UL RS may not be associated with an uplink data and/or control channel. The transmit power of the UL RS on different UE beams could be the same.

In one embodiment, a TPC (command) could be applied specifically for power control of the UL RS, instead of for an uplink data and/or control channel. The specific power value could be configured or specified. Alternatively, the specific power value could be a UL transmission power of a third UE beam derived from a random access procedure. The derivation of the transmit power of the UL RS could include a pathloss. The pathloss could be derived from DL RS measurement result of eNB beams or TRP beams. The DL RS could be a beam reference signal.

The transmit power may not be smaller than the specific power value. The transmit power (of the UL RS) could be set as the specific power value. Alternatively, the transmit power (of the UL RS) could be set as the specific power value+pathloss.

The derivation of the transmit power of the UL RS could comprise an offset. Alternatively or additionally, the derivation of the transmit power could be based on an offset. The offset could be a qualified beam criterion, wherein a eNB beam is considered with qualified channel quality if the eNB beam with RSRP, SINR, or PL (absolute) difference smaller than the qualified beam criterion comparing to a eNB beam or TRP beam with the best channel quality.

In one embodiment, the (initial) transmit power of the UL RS could be derived at least from an offset and the required UL transmit power of a UE beam(s) derived from a random access procedure. The required UL transmit power of a UE beam for eNB or TRP detection could mean that the eNB or TRP receives the UL RS with received power exceeding a reception threshold.

The derivation of the transmit power of the UL RS could comprise the required UL transmit power of a UE beam for eNB or TRP detection wherein the UE beam is associated with a eNB beam or TRP beam with the best channel quality. The transmit power of the UL RS could be derived at least from an offset and the required UL transmit power of a UE beam for eNB or TRP detection, wherein the UE beam is associated with a eNB beam or TRP beam with the best channel quality.

Alternatively or additionally, the derivation of the transmit power of the UL RS could comprise a minimum value among the required UL transmit power of each UE beam for eNB or TRP detection. The transmit power of the UL RS could be derived at least from an offset and a minimum value among the required UL transmit power of each UE beam for eNB or TRP detection. The required UL transmit power of a UE beam for eNB or TRP detection could be derived from measuring DL RS of eNB beam(s) or TRP beam(s) on the UE beam.

In one embodiment, if there is no detected eNB beam or TRP beam or if there is no linked qualified eNB beam or TRP beam on a UE beam, the UE could skip some or all transmit occasions of the UL RS on the UE beam.

In one embodiment, if there is no detected eNB beam or TRP beam or if there is no linked qualified eNB beam or TRP beam on a UE beam, the required UL transmit power of the UE beam could be determined as Pcmax.

In one embodiment, if there is no detected eNB beam or TRP beam or if there is no linked qualified eNB beam or TRP beam on a UE beam, the required UL transmit power of the UE beam may not be included in the derivation of the transmit power of the UL RS.

In one embodiment, a specific value could be configured or specified as minimum required transmit power for the transmit power of the UL RS.

In one embodiment, if there is any detected eNB beam or TRP beam or if there is linked qualified eNB beam(s) or TRP beam(s) on a UE beam, the UE could skip some or all transmit occasions of the (periodic) UL RS on the UE beam. The UE could transmit the (periodic) UL RS, except on UE beam(s) with a (periodic) UL RS transmission for UL channel measurement. No detected eNB beams or TRP beams on a UE beam could mean that DL RS is not be detected on the UE beam or that measured channel quality of the DL RS is worse. No linked qualified eNB beam(s) or TRP beam(s) on a UE beam could mean that an associated DL RS is not detected on the UE beam or that measured channel quality of the DL RS is worse. Worse measured channel quality of the DL RS means that RSRP of the DL RS is lower than a threshold.

In one embodiment, a eNB beam or TRP beam with qualified channel quality could mean that the UE receives the eNB beam or TRP beam with RSRP or SINR larger than some threshold or pathloss smaller than some threshold. The DL RS could be a beam reference signal.

Referring back to FIGS. 3 and 4, in one exemplary embodiment of a UE illustrated in FIG. 18 and discussed above, the device 300 includes a program code 312 stored in the memory 310. The CPU 308 could execute program code 312 to enable the UE (i) to derive a transmit power of a UL RS based on a specific power value, and (ii) to transmit the UL RS with the transmit power. Furthermore, the CPU 308 can execute the program code 312 to perform all of the above-described actions and steps or others described herein.

Referring back to FIGS. 3 and 4, in one exemplary embodiment of a UE shown in FIG. 19 and discussed above, the device 300 includes a program code 312 stored in the memory 310. The CPU 308 could execute program code 312 to enable the UE (i) to derive a transmit power of a UL RS wherein the derivation of the transmit power comprises a required UL transmit power of UE beam(s) for eNB or TRP detection, and (ii) to transmit the UL RS with the transmit power. Furthermore, the CPU 308 can execute the program code 312 to perform all of the above-described actions and steps or others described herein.

Referring back to FIGS. 3 and 4, in one exemplary embodiment of a UE illustrated in FIG. 20 and discussed above, the device 300 includes a program code 312 stored in the memory 310. The CPU 308 could execute program code 312 to enable the UE (i) to derive a transmit power of a UL RS based on a specific power value, (ii) to transmit the UL RS on a first UE beam of multiple UE beams with the transmit power, and (iii) to transmit the UL RS on a second UE beam of the multiple UE beams with the transmit power. Furthermore, the CPU 308 can execute the program code 312 to perform all of the above-described actions and steps or others described herein.

In general, based on the invention, the UL RS transmit power can be determined based on the functional characteristic and requirement. The UL RS transmit power for beam management can be set to assist TRP or eNB in detecting and/or tracking qualified eNB beam(s) and/or qualified UE beam(s) for the UE.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:
1. A method of a UE (User Equipment) for transmitting UL (Uplink) RS (Reference Signal), comprising:
   receiving, from a network node, a configuration of a UL channel measurement RS;
   receiving, from the network node, a configuration of a periodic beam management RS;
   deriving, by the UE, a first transmit power of the UL channel measurement RS on one UE beam based on a first power control mechanism, wherein derivation of the first transmit power based on the first power control mechanism uses a close-loop power control adjustment state of an uplink data channel on the one UE beam, and wherein the first power control mechanism is used to derive a different transmit power of another UL channel measurement RS on a second UE beam than the first transmit power of the UL channel measurement RS on the one UE beam;

deriving, by the UE, a second transmit power of the periodic beam management RS based on a second power control mechanism, wherein derivation of the second transmit power based on the second power control mechanism (i) does not use a close-loop power control adjustment state of any uplink data channel and (ii) does not use a close-loop power control adjustment state of any uplink control channel; and transmitting, by the UE, the UL channel measurement RS and the periodic beam management RS to the same network node with different transmit powers each associated with a different type of UL RS, the transmitting comprising:

transmitting, from the UE to the network node, the UL channel measurement RS with the first transmit power derived from the close-loop power control adjustment state of the uplink data channel; and transmitting, from the UE to the network node, the periodic beam management RS with the second transmit power not derived from a close-loop power control adjustment state of any uplink data channel and not derived from a close-loop power control adjustment state of any uplink control channel.

2. The method of claim 1, wherein the uplink data channel is Physical Uplink Shared Channel (PUSCH).

3. The method of claim 1, further comprising:

receiving a first TPC (Transmit Power Control) command from the network node, wherein the first TPC command is applied to the first power control mechanism of the UL channel measurement RS on the one UE beam and is applied to the uplink data channel on the one UE beam; and receiving a second TPC command from the network node, wherein the second TPC command is applied to the second power control mechanism of the periodic beam management RS on a plurality of UE beams and is neither applied to the uplink data channel nor the first power control mechanism of the UL channel measurement RS.

4. The method of claim 1, wherein derivation of the second transmit power based on the second power control mechanism uses a TPC (Transmit Power Control) command instead of a close-loop power control adjustment state.

5. The method of claim 1, wherein the UL channel measurement RS is sounding reference signal and the periodic beam management RS is sounding reference signal.

6. The method of claim 1, wherein the UL channel measurement RS is a UL RS for facilitating UL channel measurement and the periodic beam management RS is a UL RS for facilitating beam management.

7. A method of a network node, comprising:

transmitting, from the network node, a first TPC (Transmit Power Control) command via a first downlink control signaling to a UE (User Equipment), wherein the first TPC command is applied to a first power control mechanism for deriving a first transmit power of a UL (Uplink) channel measurement RS (Reference Signal) on one UE beam and is applied to an uplink data channel on the one UE beam, wherein the first power control mechanism is usable to derive a different transmit power of another UL channel measurement RS on a second UE beam than the first transmit power of the UL channel measurement RS on the one UE beam;

transmitting, from the network node, a second TPC command via a second downlink control signaling to the UE, wherein the second TPC command is applied to a second power control mechanism for deriving a second transmit power of a periodic beam management RS and is neither applied to the uplink data channel nor the first power control mechanism of the UL channel measurement RS, and the second TPC command is applied to the second power control mechanism of the periodic beam management RS on a plurality of UE beams;

performing, by the network node, beam management based on receiving the periodic beam management RS from the UE via a first beam and receiving the periodic beam management RS from the UE via a second beam; and performing, by the network node, UL channel measurement based on receiving the UL channel measurement RS from the UE.

8. The method of claim 7, further comprising:

wherein derivation of the first transmit power based on the first power control mechanism is associated with a close-loop power control adjustment state of the uplink data channel; and wherein derivation of the second transmit power based on the second power control mechanism (i) is not associated with a close-loop power control adjustment state of any uplink data channel and (ii) is not associated with a close-loop power control adjustment state of any uplink control channel.

9. The method of claim 7, wherein derivation of the first transmit power based on the first power control mechanism uses pathloss derivation of the uplink data channel.

10. The method of claim 7, wherein the UL channel measurement RS is sounding reference signal and the periodic beam management RS is sounding reference signal.

11. The method of claim 7, wherein the UL channel measurement RS is at least one of configured or transmitted on a UE beam linked with a qualified network beam.

12. The method of claim 7, wherein performing the beam management comprises at least one of detecting or tracking at least one of one or more qualified network beams or one or more qualified UE beams.

13. A User Equipment (UE), comprising:

a control circuit;

a processor installed in the control circuit; and a memory installed in the control circuit and operatively coupled to the processor;

wherein the processor is configured to execute a program code stored in the memory to:

receive, from a network node, a configuration of a UL (Uplink) channel measurement RS (Reference Signal);

receive, from the network node, a configuration of a periodic beam management RS;

derive a first transmit power of the UL channel measurement RS on one UE beam based on a first power control mechanism, wherein derivation of the first transmit power based on the first power control mechanism uses a close-loop power control adjustment state of an uplink data channel on the one UE beam, and wherein the first power control mechanism is used to derive a different transmit power of another UL channel measurement RS on a second UE beam than the first transmit power of the UL channel measurement RS on the one UE beam;

derive a second transmit power of the periodic beam management RS based on a second power control mechanism, wherein derivation of the second transmit power based on the second power control mechanism (i) does not use a close-loop power control adjustment state of any uplink data channel and (ii) does not use a close-loop power control adjustment state of any uplink control channel;

transmit, from the UE to the network node, the UL channel measurement RS on the one UE beam with the first transmit power derived from the close-loop power control adjustment state; and transmit, from the UE to the network node, the periodic beam management RS with the second transmit power not derived from a close-loop power control adjustment state of any uplink data channel and not derived from a close-loop power control adjustment state of any uplink control channel.

14. The UE of claim 13, wherein the uplink data channel is Physical Uplink Shared Channel (PUSCH).

15. The UE of claim 13, wherein the processor is further configured to execute the program code stored in the memory to:

receive a first TPC (Transmit Power Control) command from the network node, wherein the first TPC command is applied to the first power control mechanism of the UL channel measurement RS on the one UE beam and is applied to the uplink data channel on the one UE beam; and receive a second TPC command from the network node, wherein the second TPC command is applied to the second power control mechanism of the periodic beam management RS on a plurality of UE beams and is neither applied to the uplink data channel nor the first power control mechanism of the UL channel measurement RS.

16. The UE of claim 13, wherein derivation of the first transmit power based on the first power control mechanism uses pathloss derivation of the uplink data channel.

17. The UE of claim 13, wherein the UL channel measurement RS is sounding reference signal and the periodic beam management RS is sounding reference signal.

18. The UE of claim 13, wherein the UL channel measurement RS is a UL RS for facilitating UL channel measurement and the periodic beam management RS is a UL RS for facilitating beam management.

\* \* \* \* \*